US007957610B2

(12) United States Patent
Toma et al.

(10) Patent No.: US 7,957,610 B2
(45) Date of Patent: Jun. 7, 2011

(54) IMAGE PROCESSING METHOD AND IMAGE PROCESSING DEVICE FOR ENHANCING THE RESOLUTION OF A PICTURE BY USING MULTIPLE INPUT LOW-RESOLUTION PICTURES

(75) Inventors: Tadamasa Toma, Osaka (JP); Satoshi Kondo, Kyoto (JP)

(73) Assignee: Panasonic Corporation, Osaka (JP)

( * ) Notice: Subject to any disclaimer, the term of this patent is extended or adjusted under 35 U.S.C. 154(b) by 1060 days.

(21) Appl. No.: 11/783,570

(22) Filed: Apr. 10, 2007

(65) Prior Publication Data

US 2007/0247529 A1 Oct. 25, 2007

(30) Foreign Application Priority Data

Apr. 11, 2006 (JP) .................................. 2006-109182
Apr. 11, 2006 (JP) .................................. 2006-109190

(51) Int. Cl.
*G06K 9/32* (2006.01)
(52) U.S. Cl. ........ 382/299; 382/254; 382/293; 382/294; 382/298; 348/222.1
(58) Field of Classification Search .......................... None
See application file for complete search history.

(56) References Cited

U.S. PATENT DOCUMENTS 6,985,641 B1    1/2006  Michel et al.
2008/0063065 A1 *  3/2008  Lin

FOREIGN PATENT DOCUMENTS
JP          2000-339450        12/2000

OTHER PUBLICATIONS

Zhang et al. "Fast MAP-based multiframe super-resolution image reconstruction", Image and Vision Computing, Jul. 2005, vol. 23, Issue 7, pp. 671-679.*
Choi et al. "Region-Based Super-Resolution Using Multiple Blurred and Noisy Undersampled Images," May 2006, ICASSP 2006 Proceedings. vol. 2, No., pp. 14-19.*
Omer et al. "Region-Based Sub-pixel Motion Estimation from Noisy, Blurred, and Down-Sampled Sequences", 2006, PCM 2006, LNCS 4261, pp. 229-236.*
Park et al. "Super-resolution image reconstruction: a technical overview", May 2003, IEEE Signal Processing Magazine, vol. 20, No. 3. pp. 21-36.*
Dekeyser et al. "A New Algorithm for Super-Resolution from Image Sequences", 2001, CAIP 2001, LNCS 2124, pp. 473-481.*
R. Srinivasan et al., "Predictive Coding Based on Efficient Motion Estimation", IEEE Transactions on Communications, vol. COM-33, No. 8, Aug. 1985, pp. 888-896.

* cited by examiner

*Primary Examiner* — Sath V Perungavoor
*Assistant Examiner* — Jason Heidemann
(74) *Attorney, Agent, or Firm* — Wenderoth, Lind & Ponack, L.L.P.

(57) ABSTRACT

An image processing device according to the present invention uses a representative picture having a first resolution and multiple reference pictures having the first resolution to generate a high-resolution picture having a second resolution higher than the first resolution. The image processing device includes a first repetition processing unit operable to repeat positioning processing while switching from one reference picture to another, and a second repetition processing unit operable to repeat update processing for updating an estimated value of a pixel in a target high-resolution picture. At least one of the first and second repetition processing units includes a determination unit operable to determine a pixel that satisfies a completion condition from the result of one of the positioning processing and the update processing, and an exclusion unit operable to exclude a pixel that satisfies the completion condition from one of the positioning processing and the update processing.

18 Claims, 22 Drawing Sheets

● : pixel positions of target picture for super resolution
○ : pixel positions of reference picture after positioning processing

IMAGE PROCESSING METHOD AND IMAGE PROCESSING DEVICE FOR ENHANCING THE RESOLUTION OF A PICTURE BY USING MULTIPLE INPUT LOW-RESOLUTION PICTURES

BACKGROUND OF THE INVENTION (1) Field of the Invention

The present invention relates to an image processing method and an image processing device that enhance the resolution of a picture by using multiple input low-resolution pictures.

(2) Description of the Related Art

Many efforts are being made to enhance the resolution of pictures captured with a digital still camera and the like to acquire clearer and crisper pictures. There is a growing interest in a method in which multiple pictures displaced with respect to each other are combined to restore high-frequency component in order to acquire a high-resolution picture closer to the original picture. According to this method, multiple pictures that are successive in time in motion video can be used to produce a high resolution one. The method is expected to find wide applications such as enhancement of the resolution of motion video captured with a video camera. The processing for generating a high-resolution picture from multiple low-resolution pictures will be hereinafter referred to as super resolution.

There are many super-resolution approaches. A widely used method is reconstruction-based super resolution which updates values of pixels of a high-resolution picture successively by repetition processing in order to acquire a stably high-quality high-resolution picture. Reconstruction-based super resolution includes positioning of multiple individual low-resolution pictures and repetition processing in which update processing for obtaining pixel values of a high-resolution picture is repeated. However, the reconstruction-based super resolution requires a large amount of computation because it involves positioning of multiple low-resolution pictures and uses repetition processing. In order to put this method into practical use, the amount of computation must be reduced. For example, one method is proposed in Patent Document 1 in which a parameter value of an evaluation function is optimized in repetition processing so as to reduce the number of repetitions.

An MAP (Maximum A Posteriori) method, which is a conventional technique for reducing the amount of computation without degrading the quality of a reconstructed super-resolution picture, will be descried below.

The MAP method uses as the initial value a high-resolution picture generated by using the bicubic method or the nearest neighbor method to obtain a high-resolution picture that maximizes a posterior probability when a number of low-resolution pictures that are observed pictures are given. The posterior probability is represented by an evaluation function which includes an error term and a convergent term. Given an imaging model, the error term represents the square error between a pixel value estimated from a high-resolution picture on the basis of the imaging model and a pixel value of a positioned low-resolution picture. The convergent term represents prior information based on the assumption that a picture is smooth all over the picture. An example of the evaluation function is given below.

[mathematical formula 1]

$$I = \sum_{i=0}^{N1-1} [\text{b\_vec}(i) * \text{h\_vec} - fi]^2 + \alpha |C(\text{h\_vec})|^2 \quad \text{(equation 1)}$$

Here, h_vec(i) in (equation 1) is a vector representation of the values of pixels in a high-resolution picture (hereinafter h_vec(i) after the n-th update is denoted by HR(n), fi is the values of pixels of a low-resolution picture after positioning, b_vec(i) is an element of a kernel representing an imaging model corresponding to the pixel position of fi, C is a function representing a prior information of smoothness, α is the weight of an error term and a convergent term, and Nl represents the number of the pixels of the low-resolution picture used for updating h_vec. Σ represents the total sum of Nl elements, from the 0-th to the Nl-1-th, (the total of the numbers of pixels of positioned low-resolution pictures and ∥ represents the L2 norm, and * represents the inner product of a vector.

In iterative computation, the evaluation function I in (equation 1) is minimized. For this purpose, optimization calculation such as a steepest-descent method or a conjugate gradient method may be used. In these method, the gradient I' of the evaluation function I (equation 2) must be obtained.

[mathematical formula 2]

$$I = 2\sum_{i=0}^{N1-1} \text{b\_vec}(i)[\text{b\_vec}(i) * \text{h\_vec} - fi] + \alpha \nabla |C(\text{h\_vec})|^2 \quad \text{(equation 2)}$$

where ∇ represents the differential of elements.

As can be seen from (equation 2), computation for each pixel that depends on Nl is required for obtaining the gradient I' and it is desirable that Nl be of the order equivalent to that of the number of the pixels of the high-resolution picture. Accordingly, the amount of computation is enormous.

Positioning for obtaining fi involves estimating the amount of motion between in the target picture for super resolution and reference pictures on a block-by-block or pixel-by-pixel basis. The amount of computation required for the estimation of the motion amount also increases as the number of reference pictures increases.

FIGS. 1A and 1B show an example in which the MAP method is applied to motion video. Application of the MAP method is not limited to motion video. For example, super resolution using still pictures of an object taken at different shooting positions (multi-view) is also possible. In the case of still pictures, the motion amount used in the following description corresponds to the amount of displacement between pictures and the motion estimation corresponds to estimation of the amount of displacement. In FIG. 1A, the k-th picture is the target picture for super resolution and the successive pictures preceding and following the target picture in time are reference pictures. One picture corresponds to one frame or one field. FIGS. 1B (a) and 1B (b) show pixels of the target picture for super resolution and pixels of a reference picture, respectively. The result of positioning by estimation of motion between the pictures is shown in FIG. 1B (c). The result of positioning shown in FIG. 1B (c) is obtained by positioning pixels of the target picture for super resolution and pixels of reference picture with the pixel positions of a high-resolution picture. The gray circles (dot-circles) and white circles in FIG. 1B (c) correspond to fi in Equation 1 or 2 and the sum of the numbers of gray and white circles corresponds to Nl. FIG. 1B (d) shows the relation between the pixels of the high-resolution picture and the pixels of the low-resolution picture after the positioning. The black circles represent the pixel positions of the high-resolution picture. The gray circles (dot-circles) after the target picture for super resolution is positioned are at the same positions as the black circles, which are the pixels of the high-resolution picture in FIG. 1B (d). It should be noted that the initial high-resolution picture is generated by interpolation of the target picture for super resolution shown in FIG. 1B (a) using the bicubic method. The error term in (equation 2) is calculated from the difference between the pixel value of a white circle (and gray circle (dot-circle)) and a pixel value of the white circle (and gray circle (dot-circle)) estimated from the pixel values of black circles around that circle. The convergent term in (equation 2) is calculated from the pixel value of a black circle. The pixel values of black circles are updated in every repetition of repetition processing.

It can be seen from the foregoing that computations involved in the positionings and the repetition processing make up a large part of the MAP method and reduction of the amount of computation for the two processes is a key.

FIG. 2 is a block diagram showing a configuration of an image processing device PROC 1 which performs conventional reconstruction-based super resolution. The image processing device 500 includes an image input unit 501, a motion estimation unit 502, a positioning unit 503, an initial picture decision unit 504, a reconstruction unit 505, and a memory 506. The image input unit 501 stores input image data in the memory 510. The motion estimation unit 502 retrieves required image data for motion estimation from the memory 510, estimates motion, and inputs obtained motion vector information 511 in the positioning unit 503. The positioning unit 503 then performs positioning based on the motion vector information 511 and outputs the result as position information 512. The initial picture decision unit 504 generates an initial high-resolution picture 513 in accordance with a specified scale factor. The reconstruction unit 505 performs repetition processing based on the position information 512 and the initial picture 513 to generate and output reconstructed picture data.

FIG. 3 is a block diagram showing a configuration of the reconstruction unit 505. The reconstruction unit 505 includes an update calculation unit 601 and a picture update determination unit 602. The update calculation unit 601 updates values of all pixels of a high-resolution picture on the basis of the position information 512 and the initial picture 513 in response to an update instruction signal 611 input from the picture update determination unit 602. The picture update determination unit 611 determines from the update result 612 of the high-resolution picture whether the repetition processing should be ended. If it determines that the repetition processing should be ended, the picture update determination unit 611 outputs high-resolution picture data; if it determines that the repetition processing should be continued, the picture update determination unit 611 provides an update instruction signal 611 to direct the update calculation unit 601 to update the high-resolution picture.

FIG. 4 is a flowchart showing operation of the conventional reconstruction-based super resolution. Positionings are performed at steps S001 through S004, the initial high-resolution picture is generated at step S005, and a high-resolution picture is reconstructed through repetition processing at step S006. Details of these steps will be described in order. First at step S001, image data representing a target picture for super resolution and N reference pictures is input. Here, N is a predetermined number of pictures. Then, determination is made at step S002 as to whether motion estimation and positioning have been completed using all N reference pictures. If so, the process proceeds to step S005; otherwise the process proceeds to step S003. At step S003, estimation of motion between the target picture pic_cur for super resolution and a reference picture pic_ref (k). Based on the motion amount estimated, positionings are performed at step S004. Here, k is an integer greater than or equal to 1 and less than or equal to N. At step S005, an initial high-resolution picture 513 is generated on the basis of the pixel values of the target picture pic_cur for super resolution in accordance with a specified scale factor. At step S006, the initial picture 513 is updated through repetition processing to output a reconstructed picture.

The motion estimation at step S003 and the repetition processing at step S066 will be described in further detail.

FIG. 5 is a flowchart showing operation of the motion estimation at step S003. The motion estimation is performed on a block-by-block basis and any block size can be specified. First, at step S0031, a pair of index numbers (i, j) specifying a block is set to (0, 0). Then, determination is made at step S0032 as to whether motion estimation for all blocks in the target picture pic_cur for super resolution has been completed. If completed, the motion estimation will end; otherwise, the process proceeds to step S0033, where estimation of motion between the (i, j)-th block in the target picture pic_cur and the block in the k-th reference picture pic_ref (k) is performed. Then, (i, j) is updated at step S0034 and the process returns to step S0032. In this way, estimation of motion between all blocks in the target picture pic_cur for super resolution and the N reference pictures is performed in the conventional motion estimation.

FIG. 6 is a flowchart showing operation of the repetition processing at step S0006. First, the number n of repetitions is set to 0 at step S0061. Determination is made at step S0062 as to whether the repetition processing has been completed. If the L2 norm of the gradient I' of an evaluation function is smaller than a predetermined threshold value $\epsilon$, the repetition processing will end and the process proceeds to step S0065, where a high-resolution picture HR (n+1) is output as a reconstructed picture. If the L2 norm is greater than or equal to the threshold value $\epsilon$, the process proceeds to step S0063, where all pixel values of the high-resolution picture HR (n) are updated to generate an updated high-resolution picture HR (n+1). It should be noted that the high-resolution picture HR (0) agrees with the initial high-resolution picture 513 generated at step S005. Then, 1 is added to the repetition counts at step S0064 and the process returns to step S0062. In this way, all pixels in the high-resolution picture HR (n) are always updated in the conventional repetition processing.

[Patent Document 1] Japanese Patent Application Publication No. 2000-339450

SUMMARY OF THE INVENTION

In the motion estimation in the conventional reconstruction-based super resolution, motion between all blocks in a target picture for super resolution and the blocks in N reference pictures is estimated. However, if a required number of low-resolution pictures for updating a high-resolution picture are positioned; super resolution can be accomplished without degrading the quality of the picture even if the number of reference pictures is less than N. FIG. 7 shows an example illustrating a problem with the conventional motion estimation. It is assumed in this example that the number of reference pictures is set to 8. In FIG. 7, (a), (b), and (c) show results of positionings of low-resolution pictures at stages where the numbers of reference pictures are 2, 4, and 8, respectively. The white circles indicate pixel positions in low-resolution pictures and black circles indicate pixel positions in a high-resolution picture. In block A, motion estimation is continued even through the pixels of a required number of low-resolution pictures for updating the high-resolution picture has been obtained at stage (b) in FIG. 7. In block B, on the other hand, pixels of a sufficient number of low-resolution pictures have not yet been obtained at stage (b) in FIG. 7. It is not until stage (c) in FIG. 7 that pixels of a required number of low-resolution pictures for updating the high-resolution picture are obtained. Thus, a first problem with the conventional motion estimation is that the motion estimation is continued until a predetermined number of pictures are referred to even in a region such as block A where motion estimation can be ended, resulting in a large amount of computation.

Furthermore, in the repetition processing in the conventional reconstruction-based super resolution, all pixels in a high-resolution picture HR (n) are updated at all times. However, the values of pixels that are no longer updated by a significant amount can be assumed to have converged. FIG. 8 shows an example illustrating another problem with the conventional repetition processing. In FIG. 8, (a) shows the relation between increase in the number of repetitions and regions where pixel values are updated in a high-resolution picture, and (b) shows the relation between increase in the number of repetitions and regions where the amount of update of pixel values exceeds a predetermined threshold value REP_STOP. As shown in (a) and (b) of FIG. 8, although the areas of regions where the amount of update of pixel values exceeds the predetermined threshold reduces with increasing number of repetitions, the region in the high-resolution picture where the pixel values are updated remains unchanged regardless of the number of repetitions. Pixels whose update amounts are less than or equal to the predetermined threshold value REP_STOP can be assumed to have converged. Accordingly, continuing the update would not improve the picture quality and therefore those pixel values do not need to be updated in the subsequent repetition processing. Thus, a second problem with the conventional repetition processing is that the update processing that is continued for those pixels whose pixel values can be considered to have converged adds to the amount of computation.

The present invention has been made in light of these circumstances and an object of the present invention is to provide an image processing device and an image processing method capable of reducing the amount of computation in super resolution without degrading the picture quality after the super resolution.

In order to achieve the object, an image processing device according to the present invention uses a representative picture having a first resolution and a plurality of reference pictures having the first resolution that are related to the representative picture to generate a target high-resolution picture having a second resolution higher than the first resolution. The image processing device includes: a first repetition processing unit operable to repeat positioning processing while switching from one reference picture to another; and a second repetition processing unit operable to repeat update processing for updating a value of a pixel in the target high-resolution picture after completion of the positioning processing performed by said first repetition processing unit; wherein, in the positioning processing, an amount of displacement of a reference picture from the representative picture is estimated and, on the basis of an estimated amount of the displacement, a pixel of the reference picture is located at a sub-pixel position in a high-resolution picture produced by enlarging the representative picture, and in the update processing, the value of the pixel in the target high-resolution picture is updated so that a value of an evaluation function is decreased, the evaluation function including, as a variable, the difference between a value of a pixel in the positioned low-resolution pixel and the value of the pixel in the target high-resolution picture, and at least one of said first and second repetition processing units includes: a determination unit operable to determine a pixel that satisfies a completion condition from a result of one of the positioning processing and the update processing; and an exclusion unit operable to exclude the pixel that satisfies the completion condition from one of the positioning processing and the update processing. With this configuration, pixels that satisfy completion conditions are excluded from one of the subsequent positioning processing and update processing to reduce the amount of computation for the repetitive positioning or update processing. Because the excluded pixels satisfy the completion conditions, the exclusion does not degrade the picture quality.

Further, said first repetition processing unit may include: a motion estimation unit operable to estimate motion of a reference picture with respect to the representative picture for each block of the representative picture; and a positioning unit operable to divide the high-resolution picture into a plurality of grids corresponding to pixels in the target high-resolution picture, and to position pixels from reference pictures at a sub-pixel position in each block in accordance with the estimated motion, wherein said determination unit may be operable to determine that a block satisfies the completion condition when the block in which the proportion of grids containing one or more pixels from reference pictures to all grids in the block exceeds a predetermined value, and said exclusion unit may be operable to exclude the pixels of a block that satisfies the completion condition from the positioning processing. With this configuration, a sufficient number of reference pixels for obtaining a high picture quality based on completion conditions can be positioned in the update processing and the amount of computation in the positioning processing can be reduced.

Furthermore, said determination unit may be operable to estimate the motion of each block of the representative picture, said positioning unit may be operable to divide the high-resolution picture into a plurality of grids corresponding to the pixels of the high-resolution picture and position a pixel of the reference picture in a sub-pixel position of the high-resolution picture on a block-by-block basis in accordance with the estimated motion, said determination unit may be operable to determine that a reference picture satisfies the completion condition when the proportion of grids containing one or more pixels from the reference pictures to all grids in the high-resolution picture exceeds a predetermined value, and said exclusion unit may be operable to exclude pixels of remaining reference pictures from the positioning processing when said determination unit determines that the reference picture satisfies the completion condition.

Still further, said determination unit may be further operable to exclude pixels of remaining reference pictures from the positioning processing when the proportion of the number of blocks determined to satisfy the completion condition to the number of all blocks in the high-resolution picture exceeds a second predetermined value.

Still further, said motion estimation unit may be operable to estimate motion of reference pictures in sequence starting from a reference picture that is closest to the representative picture in the order in which the reference pictures are displayed.

Still further, the image processing device may further include a judgment unit operable to judge whether or not a reference picture belongs to the same scene to which the representative picture belongs, wherein said motion estimation unit is operable to exclude a reference picture that belongs to a different scene from motion estimation.

Still further, said second repetition processing unit may include an update unit operable to update a pixel value so as to decrease the value of the evaluation function, wherein said determination unit may be operable to determine that a pixel satisfies the completion condition when an amount of the update which is the difference between the value of the pixel before the update and the value of the pixel after the update is equal to a threshold value, and said exclusion unit may be operable to exclude a pixel that is determined to satisfy the completion condition from the update processing. With this configuration, the completion conditions cause estimated values of high-resolution pixels to sufficiently converge in the update processing and therefore the picture quality is not degraded and the amount of computation for the update processing can be reduced.

Still further, the threshold value may be a predetermined value.

Still further, the threshold value may be determined so that the proportion of the number of pixels that are not excluded by said determination unit to the number of all the pixels of the high-resolution picture is less than or equal to a predetermined value.

Still further, said update unit may be operable to calculate a gradient of the evaluation function by using only the values of pixels that are not excluded by said determination unit and updates an estimated value of a pixel of the high-resolution picture on the basis of the gradient.

Still further, said update unit may be operable to end update of estimated values of all pixels when the rate of reduction in the total of the differences for pixels that are not excluded by said determination unit becomes less than a predetermined value.

The image processing method, program, and semiconductor integrated circuit according to the present invention include the same units as those described above.

As has been described above, according to the present invention, regions in a high-resolution picture that require motion estimation are selectively determined on the basis of the arrangement of the pixels of a low-resolution picture positioned or determination is made as to whether motion estimation for the entire high-resolution picture can be ended. Therefore, the amount of computation involved in motion estimation can be reduced without degrading the picture quality after super resolution.

FURTHER INFORMATION ABOUT TECHNICAL BACKGROUND TO THIS APPLICATION

The disclosure of Japanese Patent Applications Nos. 2006-109182 filed on Apr. 11, 2006 and 2006-109190 filed on Apr. 11, 2006 including specification, drawings and claims are incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Embodiments of the present invention will be described with reference to the accompanying drawings.

First Embodiment

An overview of an image processing device 100 according to a first embodiment of the present invention will be described first. The image processing device 100 differs from conventional image processing devices in that the image processing device 100 selectively decides a block in a target picture for super resolution where motion estimation is to be performed.

The image processing device according to the first embodiment uses a representative picture having a first resolution and a plurality of reference pictures having the first resolution that are related to the representative picture to generate a target high-resolution picture having a second resolution higher than the first resolution, and includes: a first repetition processing unit that repeats positioning processing while switching from one reference picture to another; and a second repetition processing unit that repeats update processing for updating a value of a pixel in the target high-resolution picture after completion of the positioning processing performed by the first repetition processing unit.

The first repetition processing unit includes: a determination unit that determines a pixel that satisfies a completion condition from a result of one of positioning processing and update processing; and an exclusion unit that excludes the pixel that satisfies the completion condition from one of the positioning processing and the update processing.

Accordingly, the positioning processing is not performed on all blocks of a representative picture for all reference pictures, but instead is performed only on those blocks in which pixels are left after exclusion by the exclusion unit. By excluding pixels that satisfy the completion conditions from the subsequent positioning processing in this way, the amount of computation for the repetitive positioning processing is reduced. Because the pixels excluded satisfy the completion condition, the exclusion does not degrade the picture quality. It should be noted that two completion conditions, namely a picture completion condition and a block completion condition, are provided in the embodiment.

Figure 9:
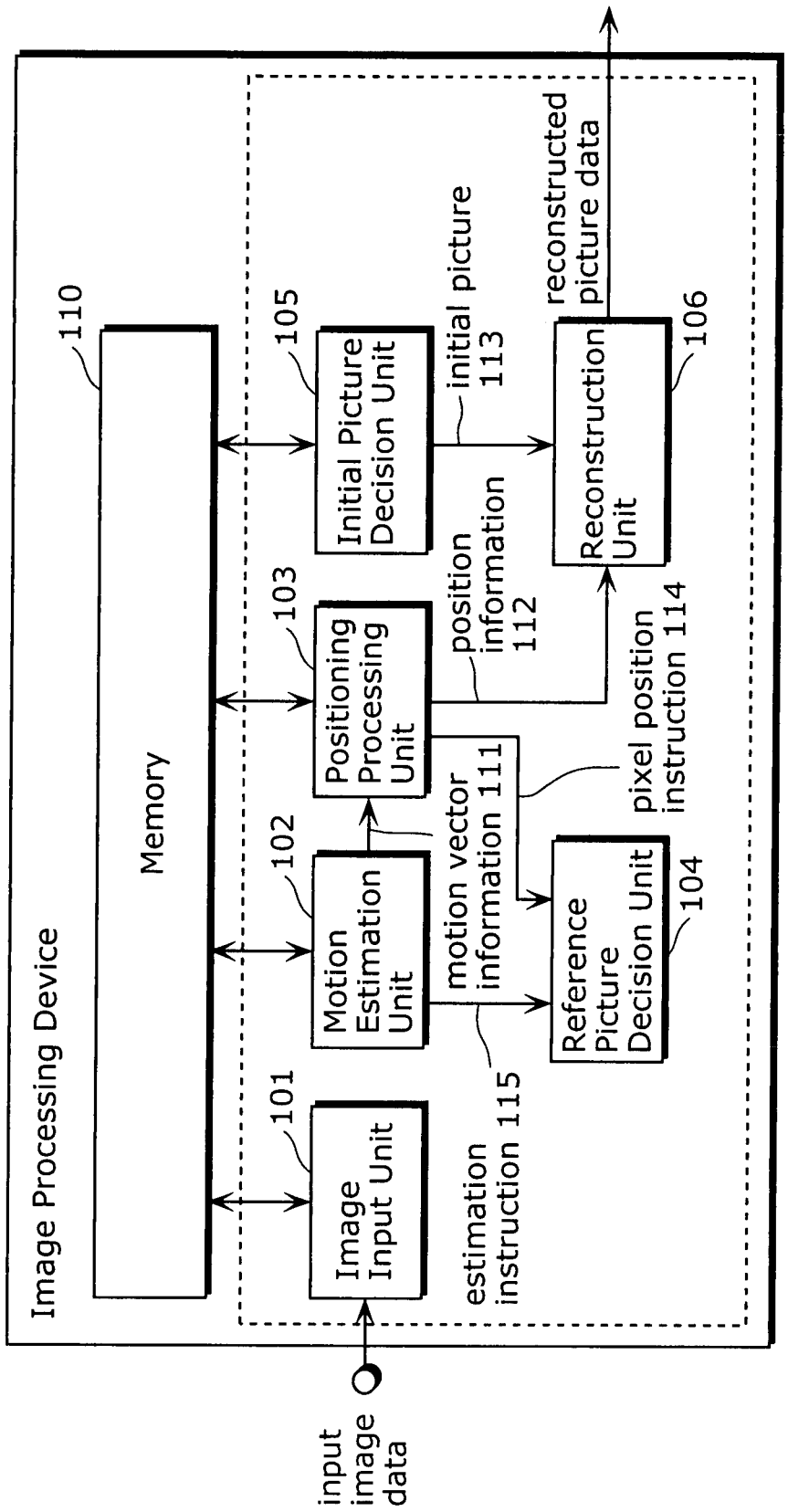
FIG. 9 is a block diagram showing a configuration of an image processing device according to a first embodiment of the present invention.

FIG. 9 is a block diagram showing a configuration of the image processing device 100. The image processing device 100 includes an image input unit 101, a motion estimation unit 102, a positioning unit 103, a reference picture decision unit 104, an initial picture decision unit 105, a reconstruction unit 106, and a memory 110.

The image input unit 101 stores input image data in the memory 110. The motion estimation unit 102 retrieves image data required for motion estimation from the memory 110, performs motion estimation, and inputs obtained motion vector information 111 in the positioning unit 103. The positioning unit 103 then performs positioning based on the motion vector information 111 and outputs the result of the positioning as position information 112. The reference picture decision unit 104 decides a reference picture and a region in a target picture for super resolution where is subjected to the motion estimation on the basis of pixel position information 114 after positioning of a low-resolution picture input from the positioning unit 103, and inputs these items of information into the motion estimation unit 102 as a motion estimation instruction signal 115. The motion estimation unit 102 performs motion estimation in accordance with the motion estimation instruction signal 115. The initial picture decision unit 105 generates an initial high-resolution picture 113 in accordance with a specified scale factor. The reconstruction unit 106 performs repetition processing on the basis of the position information 112 and the initial picture 113 to generate and output reconstructed picture data.

If a target picture does not satisfy a picture completion condition, the reference picture decision unit 104 decides the next reference picture from among the remaining reference pictures; if the target picture satisfies the picture completion condition, the reference picture decision unit 104 excludes the remaining reference pictures from the motion estimation. The reference picture decision unit 104 also decides a block that does not satisfy a block completion condition as a region to which motion estimation is to be applied and excludes a block that satisfies the block completion condition from the regions to which the motion estimation is to be applied.

Figure 10:
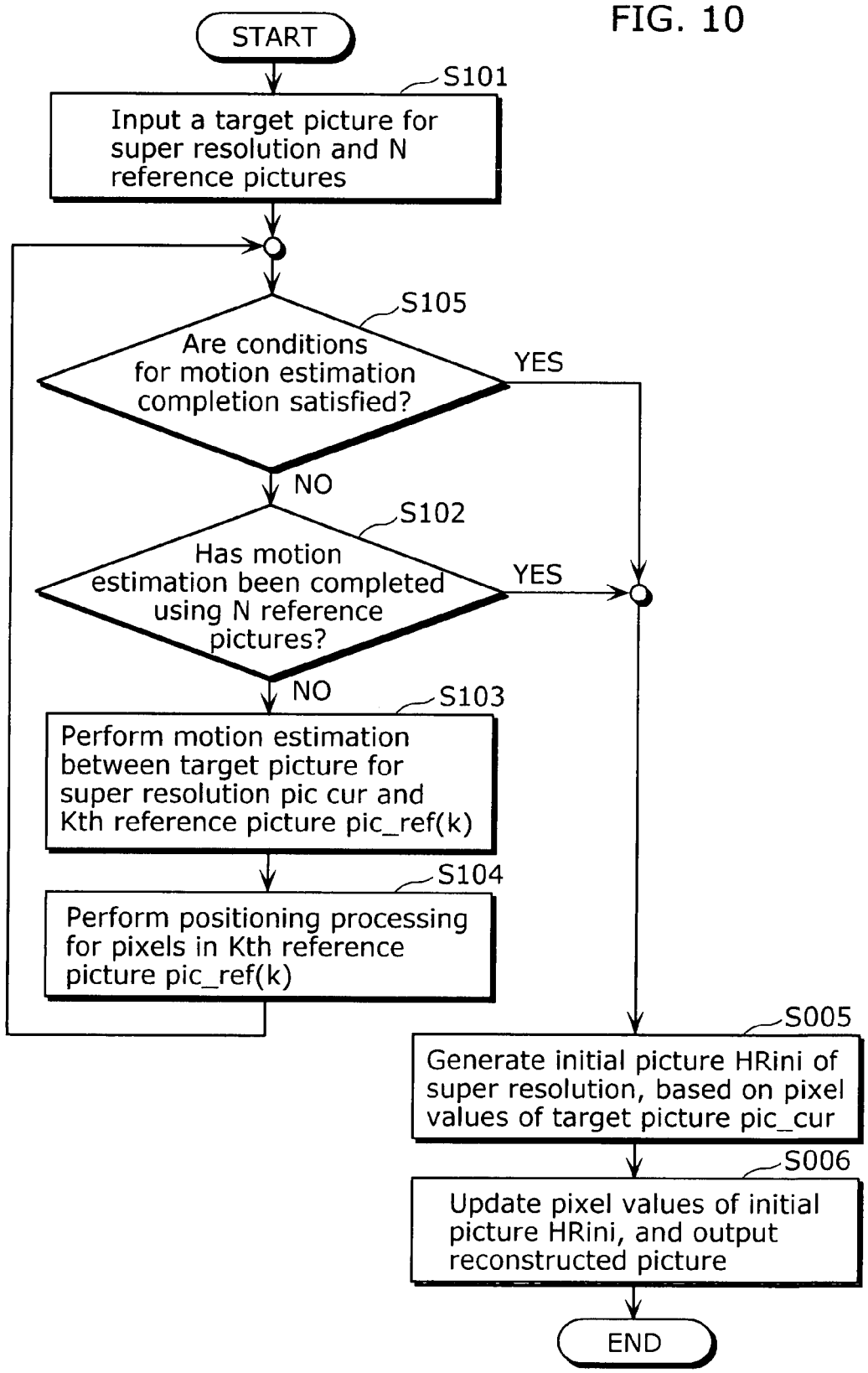
FIG. 10 is a flowchart showing operation of the image processing device according to the first embodiment.

FIG. 10 is a flowchart showing operation of the image processing device 100. Operations at steps S005 and S006 performed after positioning of low-resolution pictures are the same as those performed in the conventional image processing device PROC 1 and are therefore labeled the same reference numerals and the description of which will be omitted. It is assumed here that the initial values of picture completion and block completion flags for each reference picture and block have been reset to 0. The picture completion flag indicates whether the picture satisfies a picture completion condition; the block completion flag indicates whether the block satisfies a block completion condition.

First, image data representing a target picture for super resolution and N reference pictures is input at step S101. Here, N is a predetermined number of pictures. N pictures are selected from among pictures as reference pictures, starting from the nearest to the target picture for super resolution in the order in which they are displayed. Then, determination is made at step S105 as to whether the target picture pic_cur for super resolution satisfies the motion estimation completion condition. The determination depends on whether the completion flag provided for each reference picture is set to 1. If the completion flag associated with the target picture pic_cur is 1, that is, the target picture satisfies the motion estimation completion conditions, the motion estimation and positioning processing are ended and then the process proceeds to step S005. Whether the target picture pic_cur for super resolution satisfies the completion conditions depends on the output from the subsequent step S103. However, in the first iteration of the loop, the process always proceeds to step S102. If the target picture does not satisfy the motion estimation completion conditions, the process proceeds to step S102, where determination is made as to whether the motion estimation and positioning have been completed using all N reference pictures. If so, the process proceeds to step S005; otherwise the process proceeds to step S103. At step S103, estimation of motion between the target picture pic_cur for super resolution and a reference picture pic_ref (k) is performed. Based on the amount of motion estimated, positioning is performed at step S104. The motion estimation and positioning are performed selectively on the basis of whether pixels of an enough number of low-resolution pictures satisfying conditions required for updating the high-resolution picture have been obtained. Here, k is an integer greater than or equal to 1 and less than or equal to N.

Figure 11:
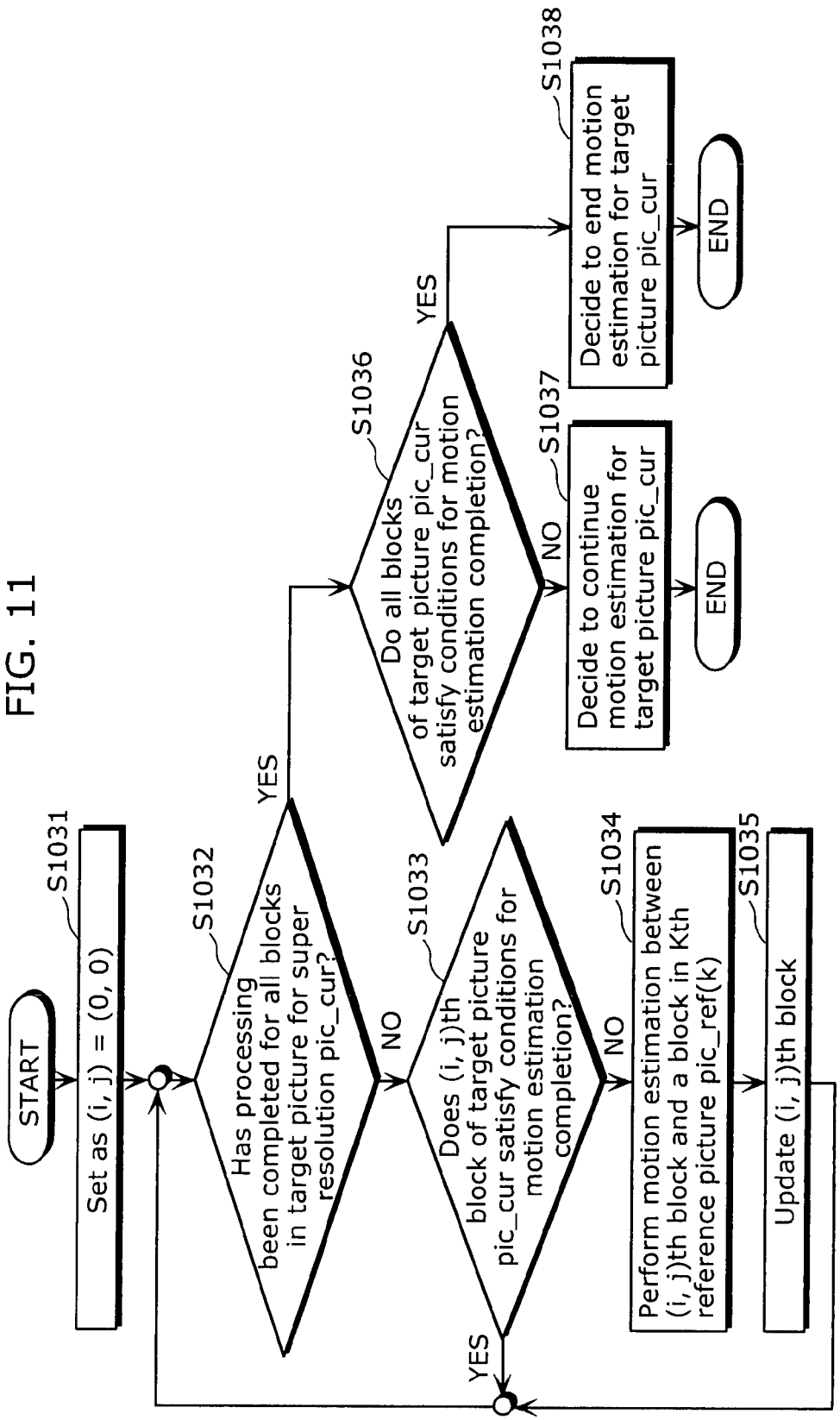
FIG. 11 is a flowchart showing operation of motion estimation performed in the image processing device according to the first embodiment.

FIG. 11 is a flowchart showing details of the motion estimation at step S103. First, index numbers i and j for identifying a block to which motion estimation is to be applied are set to 0 at step S1031. Then, at step S1032, determination is made as to whether the operations at steps S1033 and S1034 have been completed for all blocks of the target picture pic_cur for super resolution. If it is determined that the operations have been completed for all blocks, the process proceeds to step S1036. Otherwise, the process proceeds to step S1033, where determination is made as to whether the (i, j)-th block satisfies the condition of motion estimation completion.

Figure 12A:
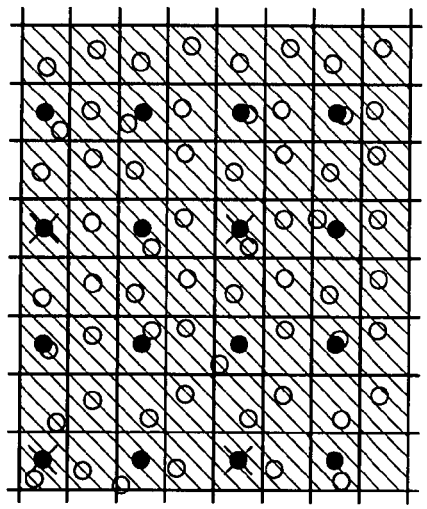
FIG. 12A is a diagram showing pixels of a high-resolution picture in the image processing device according to the first embodiment.
Figure 12B:
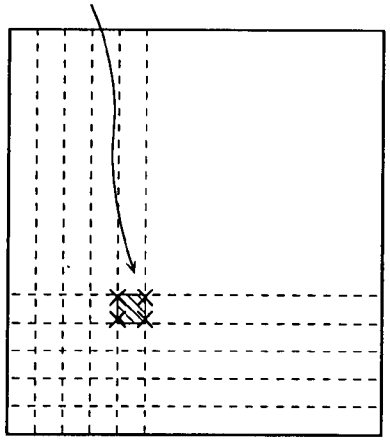
FIG. 12B is a diagram showing a grid of a high-resolution picture in the image processing device according to the first embodiment.
Figure 12C:
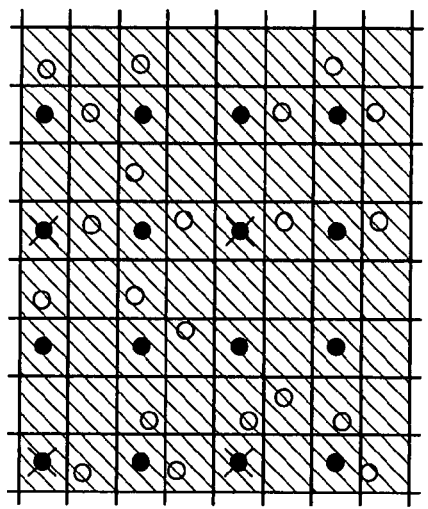
FIG. 12C is a diagram showing an example that satisfies completion conditions in the image processing device according to the first embodiment.
Figure 12D:
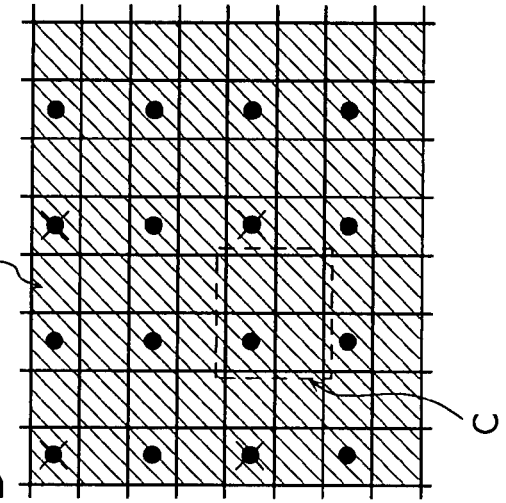
FIG. 12D is a diagram showing an example that does not satisfy the completion conditions in the image processing device according to the first embodiment.

FIGS. 12A to 12D show an exemplary condition of motion estimation completion in the case where the resolution of a low-resolution picture is to be doubled. FIG. 12A shows the position of a block in a target picture pic_cur for super resolution. The shaded portion corresponds to the (4, 4)-th block and the crosses represent pixels in the target picture pic_cur for super resolution. FIG. 12B shows pixel positions in a high-resolution picture. The black circles represent pixel positions in the high-resolution picture. Since the resolution is doubled in this example, the pixels of the original target picture pic_cur for super resolution are spaced one pixel apart both in horizontal and vertical directions as represented by the crosses. Furthermore, each pixel of the high-resolution picture is divided into grids as shown in region C. In this example, a region corresponding to one pixel is divided into 2×2 grids. FIGS. 12C and 12D show the same regions of reference pictures positioned. The white circles represent pixels of the reference pictures positioned. FIG. 12C shows a case where every grid includes one or more pixels from the target pictures pic_cur for super resolution or reference pictures pic_ref. This case is considered as satisfying the condition of motion estimation completion for the (4, 4)-th block. On the other hand, in the case shown in FIG. 12D, there are grids that do not include pixels of the target picture pic_cur for super resolution or pixels of the reference pictures. This case does not satisfy the condition of motion estimation completion for the (4, 4)-th block.

In this way, if all grids within all pixels in a block in a high-resolution picture that corresponds to the (i, j) block in the target picture pic_cur for super resolution are filled with pixels of one or more low-resolution pictures after positioning, it is determined that motion estimation for the (i, j)-th block should be ended.

If it is determined at step S1033 that the estimation of motion of the (i, j)-th block should be ended, the block completion flag associated with that block among the block completion flags provided for individual blocks is set to 1 and then the process returns to step S1032. Otherwise, the process proceeds to step S1034, where estimation of motion of the (i, j)-th block from the reference picture pic_ref (k) is performed. Block matching or phase-only correlation may be used for motion estimation. The process then proceeds to step S1035, where the index numbers (i, j) are updated, then returns to step S1032. At step S1036, determination is made as to whether all blocks have satisfied the condition of motion estimation completion. If the picture completion condition is satisfied, the process proceeds to step S1038, where it is determined that motion estimation for the target picture pic_cur for super resolution should be ended. As a result of the determination, the picture completion flag associated with the target picture pic_cur is set to 1. If there is a block that does not satisfy the condition of picture motion estimation completion, the process proceeds to step S1037, where it is determined that motion estimation for the target picture pic_cur for super resolution should be continued. As a result of the determination, the picture completion flag associated with the target picture pic_cur remains 0.

The completion condition at step S1033 is not limited to the condition that all grids of each pixel in the high-resolution picture are filled. For example, any of the following conditions 1 to 4 may be used.

1. The proportion of grids filled with pixels of one or more low-resolution pictures to the grids corresponding to the pixels of the high-resolution picture is greater than or equal to a predetermined value. This condition is especially effective for the following reasons. For example, if the pixels of a high-resolution picture are divided into 4×4 grids, at least 16 reference pictures are needed for filling all grids. As the number of reference pictures increases, not only the amount of computation but also the memory required for storing the reference pictures increase. If the proportion of grids filled is greater than the predetermined value, a sufficiently high picture quality of a reconstructed high-resolution picture can be achieved. Therefore, this method is highly advantageous.

This predetermined proportion may be changed in accordance with the nature of the image in a block. Picture quality is notably improved as the number of filled grids increases in regions such as edges, for example, where the proportion of high-frequency component is large, compared with flat regions containing little high-frequency component. Therefore, if it is found as a result of edge detection in a block that the block contains high-frequency component such as an edge or the proportion of high-frequency component is large, motion estimation may be continued until more grids are filled.

2. The proportion of grids filled with pixels of one or more low-resolution pictures to grids near a pixel position of a high-resolution picture in the grids corresponding to the pixels of the high-resolution picture is greater than or equal to a predetermined value. For example, determination may be made as to whether the grids adjacent to a grid containing pixel positions of the high-resolution picture are filled.

3. Certain grids such as grids adjacent to a pixel position of a high-resolution picture among grids corresponding to the pixels of the high-resolution picture are filled with pixels of N or more low-resolution pictures.

4. An increase in the proportion of grids filled with pixels of one or more low-resolution picture to the grids corresponding to the pixels of a high-resolution picture satisfies a predetermined condition. For example, the increase or the proportion of the number of newly filled grids to the total number of the grids filled with pixels of one or more low-resolution pictures decreases below a predetermined value, it is considered that there is no longer a reference picture that has a motion that causes the other grids to be filled, and therefore the motion estimation is ended.

The shape of a grid is not limited to square. For example, grids may be set concentrically in accordance with the distance from a pixel position of a high-resolution picture.

Figure 13:
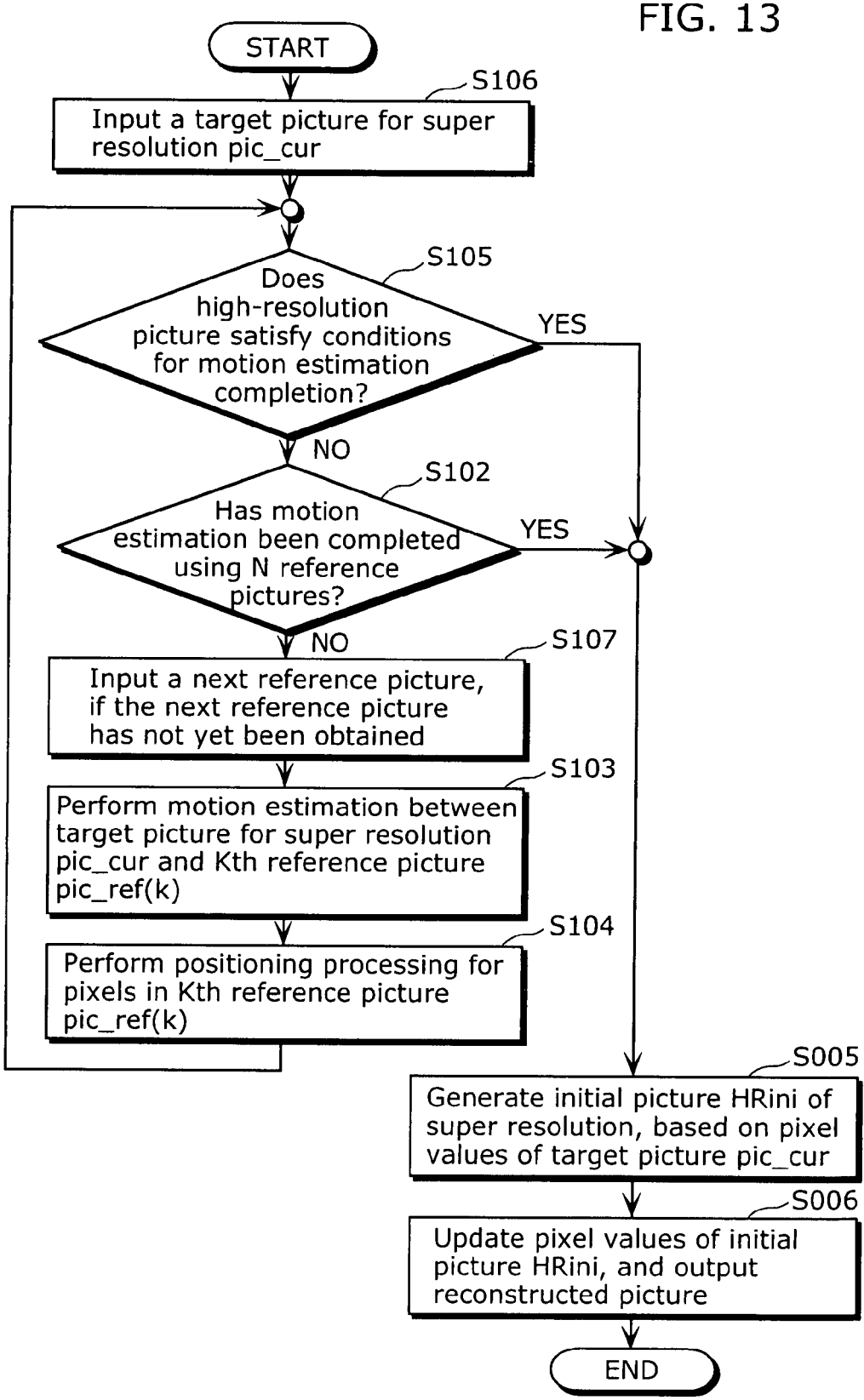
FIG. 13 is a flowchart showing an operation for inputting a reference picture in the image processing device according to the first embodiment.

While all pictures that can be referred to are input beforehand at step S101, reference pictures may be input in order at steps S105 and S102 if it is determined that a new reference picture is required. FIG. 13 is a flowchart showing operation for inputting a reference picture as needed. In this operation, the target picture pic_cur for super resolution is input first at step S106, then a reference picture is input at step S107. At step S107, determination is made as to whether the next picture to be referred to has been obtained. If not, the next reference picture is input. In cases where pictures of motion video are to be super resolved sequentially, reference pictures that were used for super-resolved pictures are stored in a memory. They can be used as reference pictures in super resolution of the subsequent pictures. Therefore, the next picture to be referred to may be input only if the next reference picture has not yet been obtained. It should be noted that reference pictures are retrieved in the order in which they are displayed, with the picture nearest to the target picture pic_cur for super resolution first.

Figure 1A:
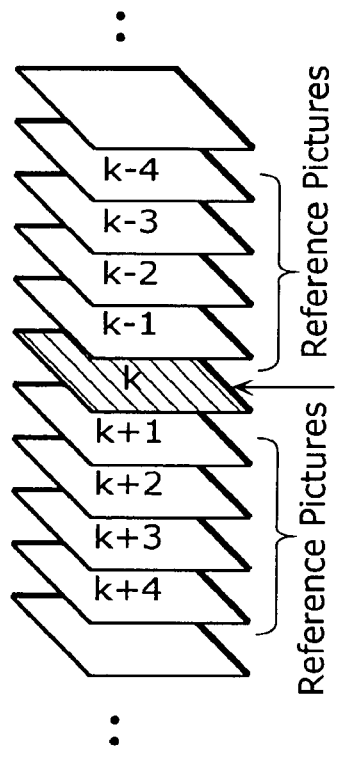
FIG. 1A is a diagram illustrating a target picture for super resolution and multiple successive reference pictures preceding and succeeding the target picture in time.
Figure 1B:
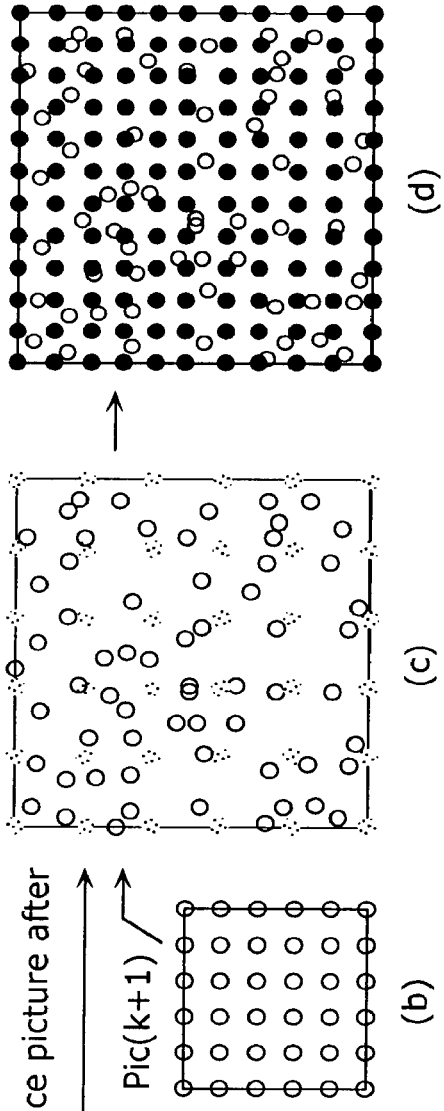
FIG. 1B is a diagram illustrating reconstruction-based super resolution and showing pixels of a target picture for super resolution, pixels of a reference picture, and pixels of a high-resolution picture.
Figure 2:
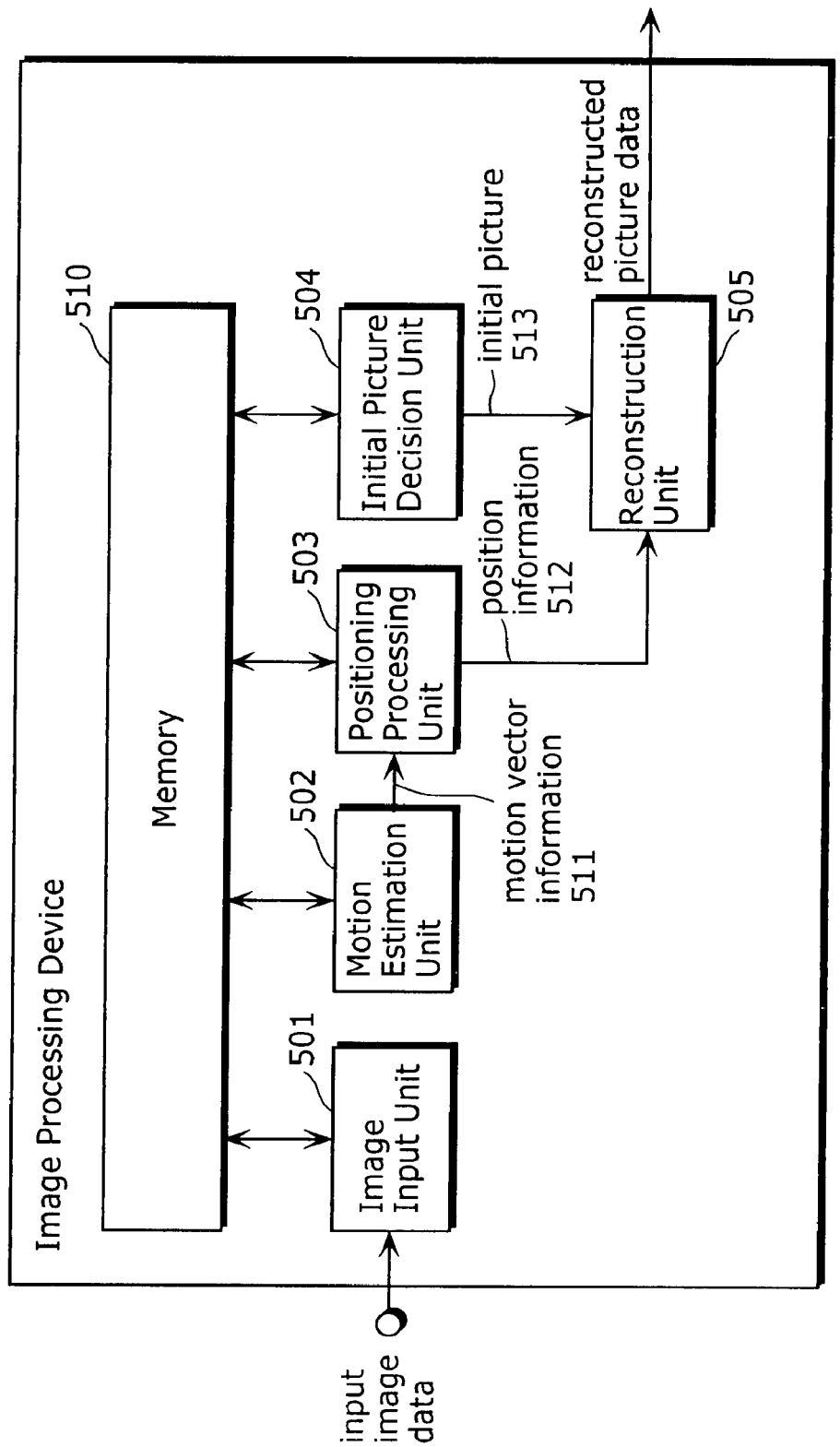
FIG. 2 is a block diagram of an image processing device that performs a conventional reconstruction-based super resolution.
Figure 3:
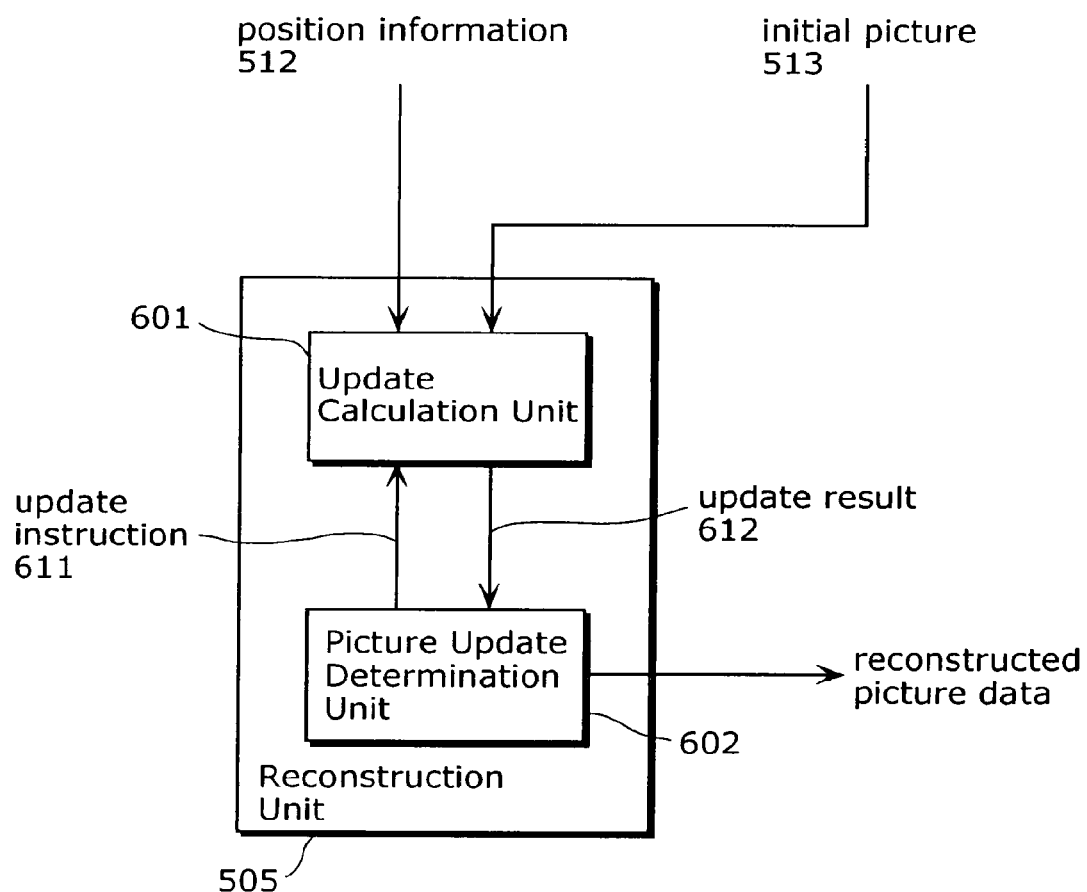
FIG. 3 is a block diagram of a reconstruction unit in the image processing device that performs the conventional reconstruction-based super resolution.
Figure 4:
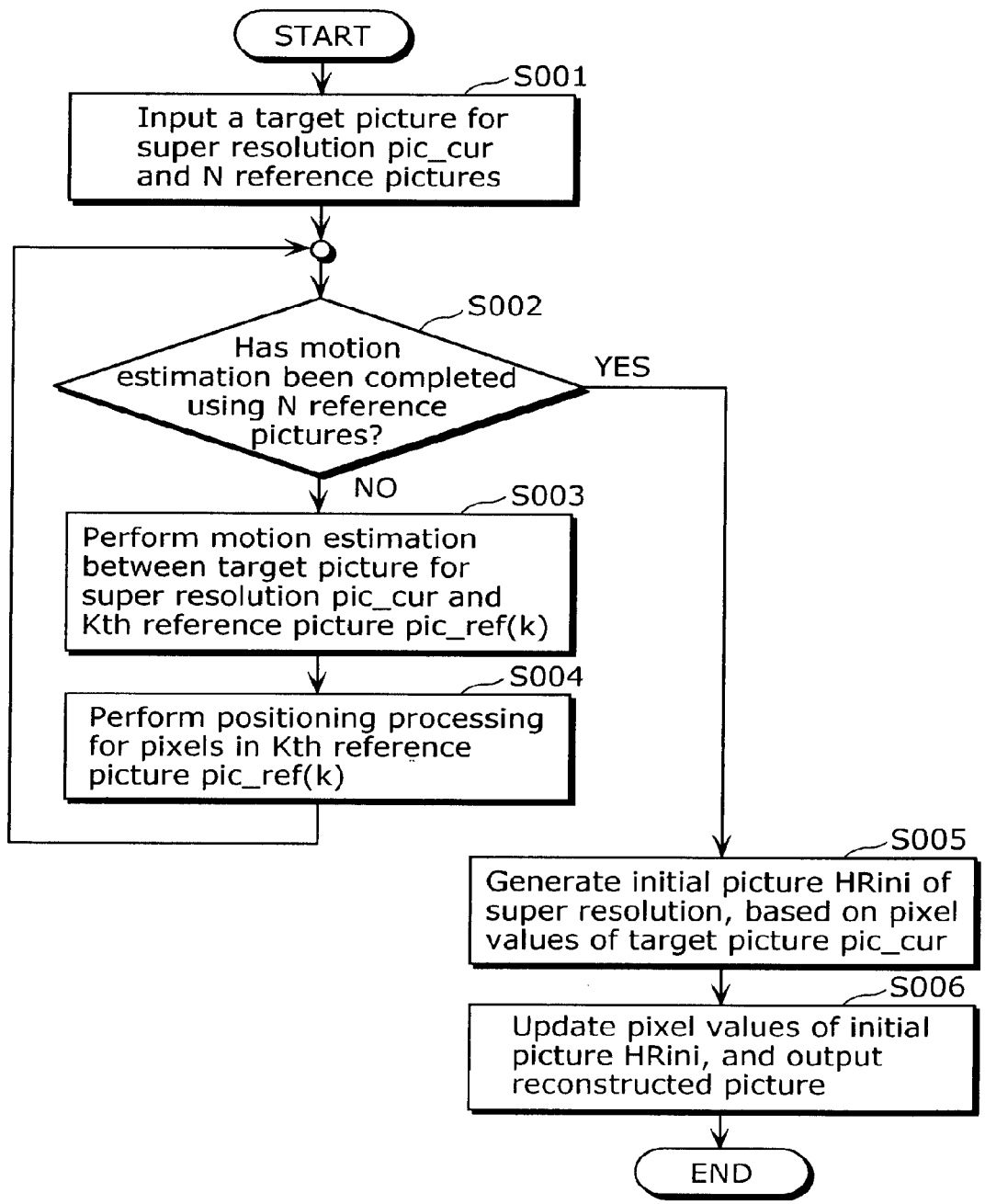
FIG. 4 is a flowchart showing operation of the conventional reconstruction-based super resolution.
Figure 5:
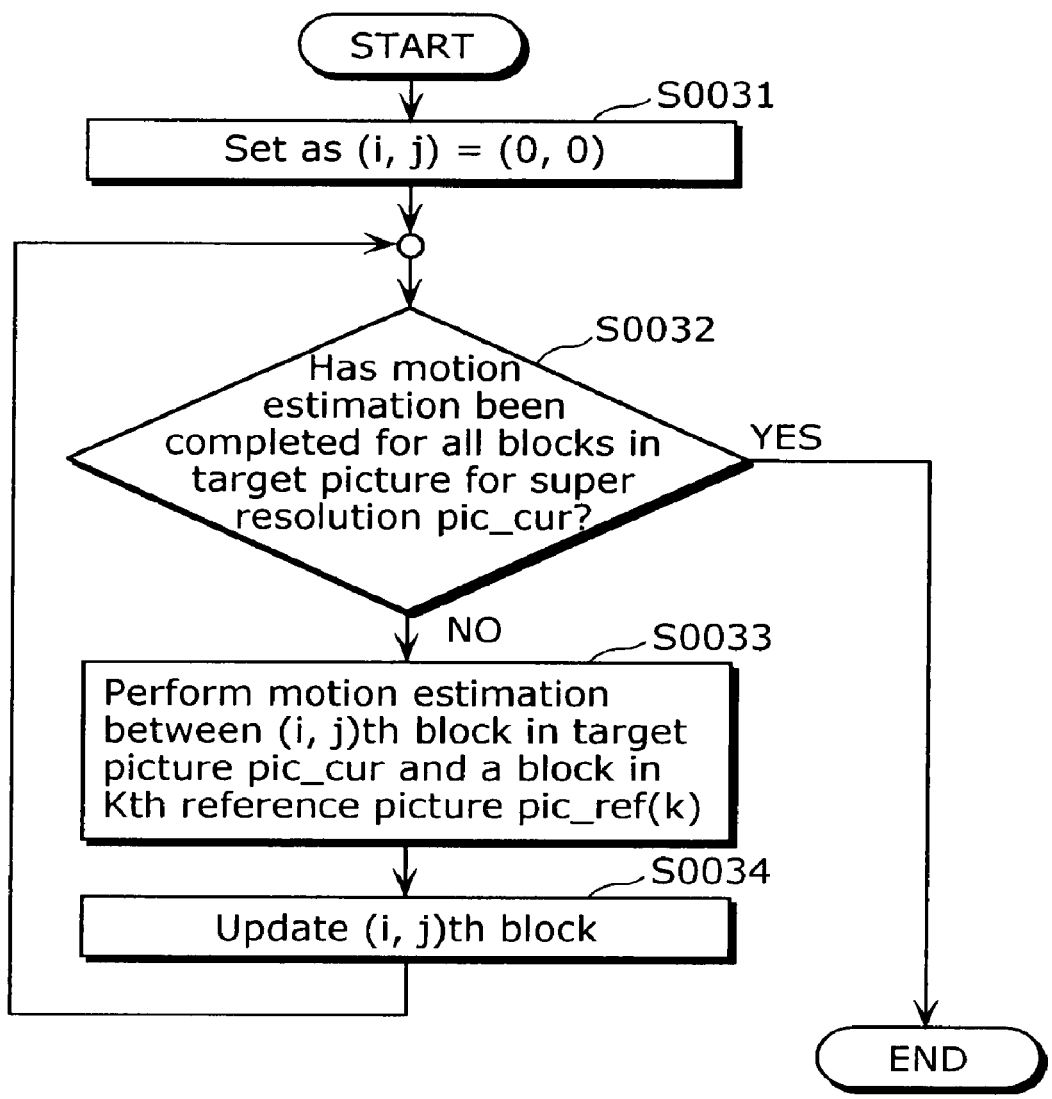
FIG. 5 is a flowchart showing operation of motion estimation in the conventional reconstruction-based super resolution.
Figure 6:
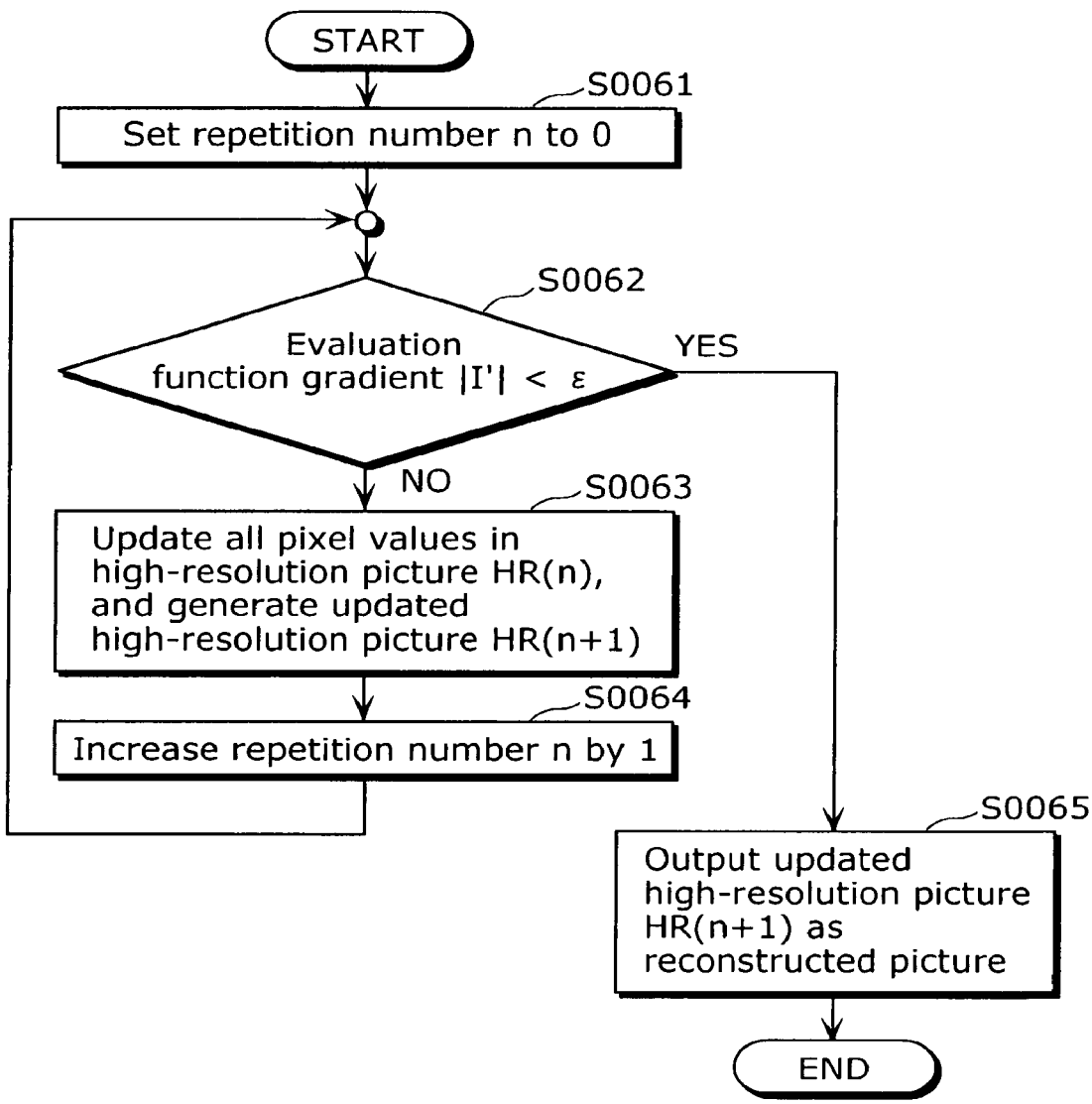
FIG. 6 is a flowchart showing operation of repetition processing in the conventional reconstruction-based super resolution.
Figure 7:
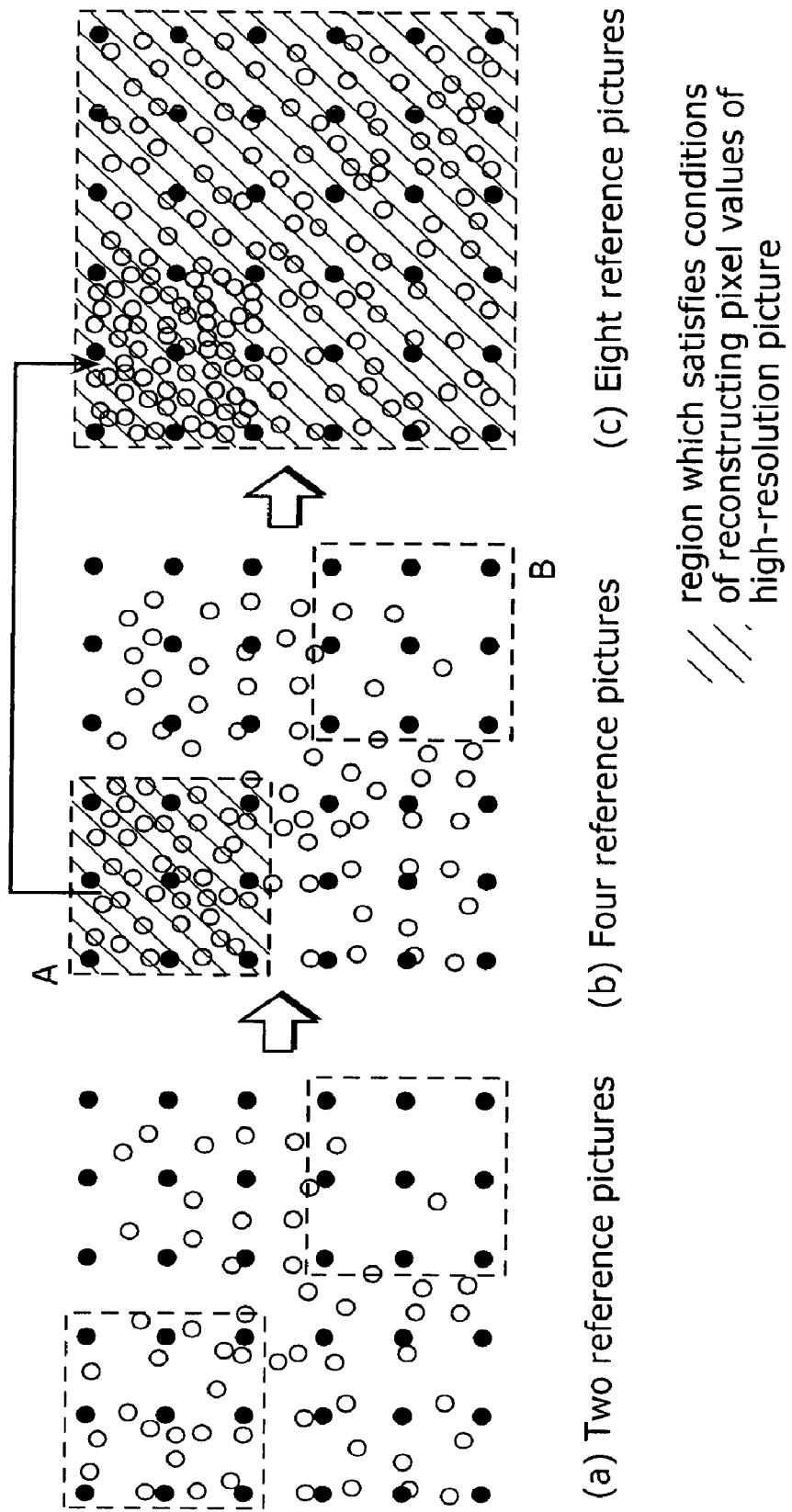
FIG. 7 is a diagram showing a problem with the motion estimation in the conventional reconstruction-based super resolution.
Figure 14:
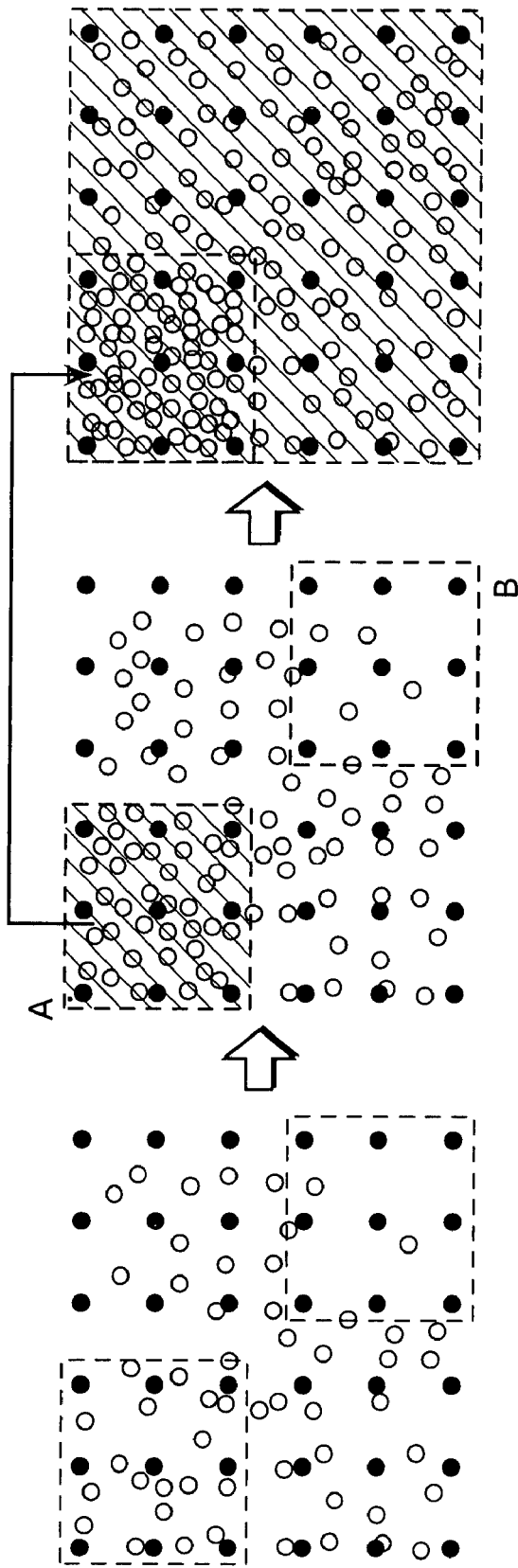
FIG. 14 is a diagram showing an effect of the image processing device according to the first embodiment.

FIG. 14 illustrates an effect of the image processing method according to the embodiment. Parts (a), (b), and (c) of FIG. 14 correspond to part (a), (b), and (c) of FIG. 7. In the conventional method as shown in FIG. 7, motion estimation is continued even for a region such as block A for which motion estimation can be ended until a predetermined number of pictures are referred to. In contrast, in the method according to the present embodiment, motion estimation is not performed on block A after positioning using four reference pictures is completed in FIG. 14(b) because motion estimation completion conditions are satisfied. Consequently, estimation of motion of block A for the fifth to eighth reference pictures can be omitted.

Variations of the first embodiment will be described below.

Motion estimation at step S103 may be performed after the resolutions of low-resolution pictures are converted into a high resolution by interpolation. For example, motion estimation may be performed after a target picture pic_cur for super resolution and a reference picture pic_ref are interpolated by using bicubic or 0-order hold.

Determination as to whether motion estimation at step S103 can be ended may be made only on a picture-by-picture basis. In this case, motion estimation is performed at step S1034 regardless of the determination as to whether the (i, j)-th block satisfies the motion estimation completion condition.

While determination is made at step S1036 as to whether all blocks satisfy the condition of motion estimation completion to determine whether estimation should be ended, motion estimation for a target picture pic_cur for super resolution may be ended if the proportion of blocks that satisfy a condition of motion estimation completion is greater than or equal to a predetermined value or if blocks such as edges that contain much high-frequency component satisfy a motion estimation completion condition.

While the motion estimation is performed with respect to a block in the target picture for super resolution in the embodiment described above, motion estimation may be performed with respect to a block in a reference picture. In that case, determination as to whether motion estimation should be ended is made only on a picture-by-picture basis because selective motion estimation based on whether the condition of motion estimation completion in the target picture for super resolution cannot be performed.

While block motion estimation has been described above, object motion estimation may be performed after an object is extracted.

While the maximum number of reference pictures is fixed at N at step S101, the maximum number may be adaptively changed. For example, if pictures in a stream of motion video are to be super-resolved in sequence, the required number of reference pictures may be set to the number of reference pictures used for the previous picture.

The generation of the initial picture 113 for super resolution at step S105 may be performed before motion estimation or before acquisition of a reference picture.

Figure 15:
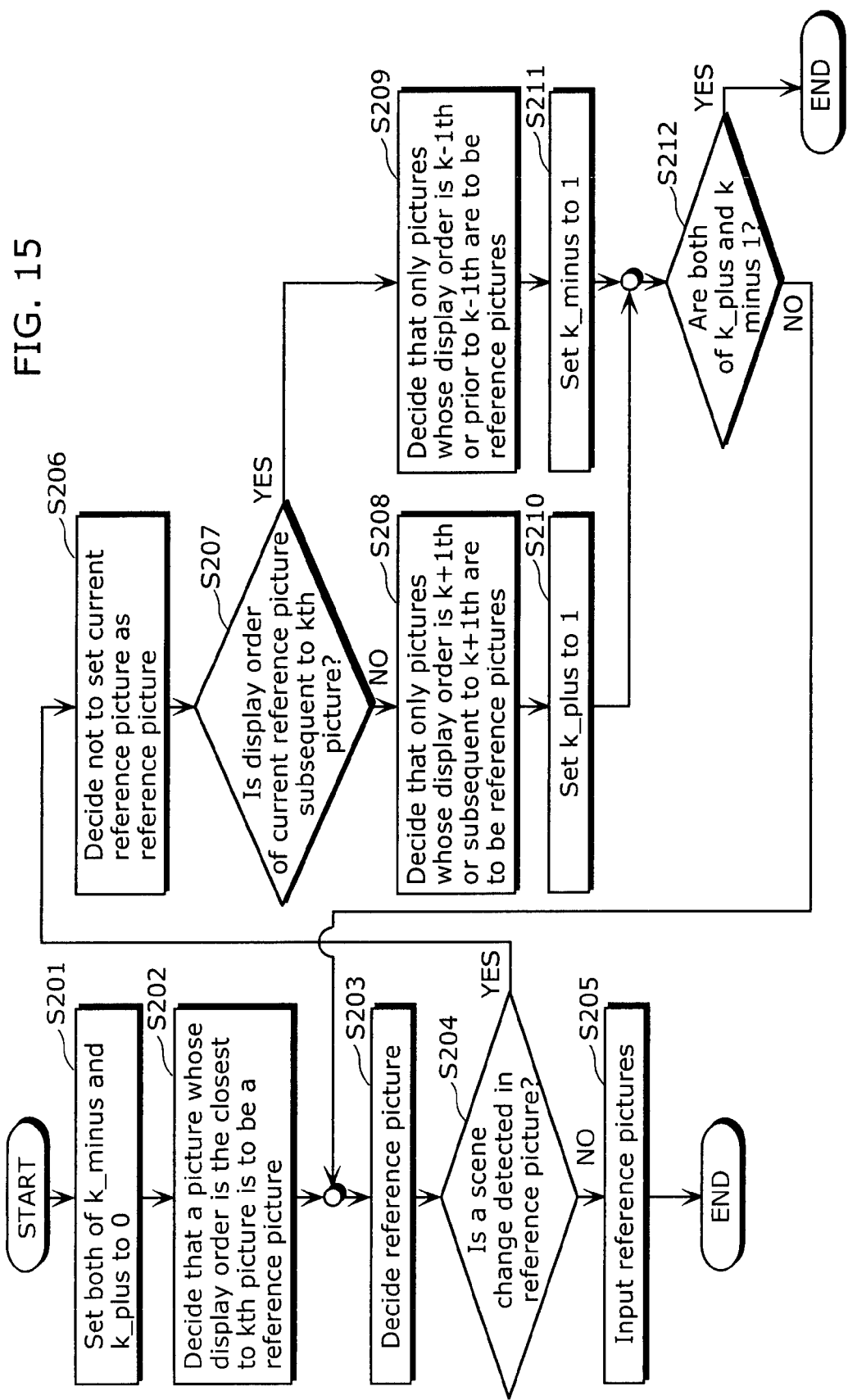
FIG. 15 is a flowchart showing an operation for deciding a reference picture in the image processing device according to the first embodiment.

Reference pictures pic_re are preferably pictures of the same scene. This is because if a scene change occurs, the correlation between the previous scene and the current scene is likely to be lost and therefore the significance of the picture as a reference picture decreases. FIG. 15 is a flowchart showing an operation at step S107 for choosing a reference picture by taking into consideration a scene change. The assumption here is that the k-th picture is the current target picture pic_cur for super resolution. First, variables k_minus and k_plus are set to 0 at step S201. Then, it is determined at step S202 that pictures are to be referred to one by one in the order in which they are displayed, starting from the picture nearest to the k-th picture. At step S203, the next picture to be referred to is determined according to the determination at step S202. Determination is made at step S204 as to whether a scene change is detected in the reference picture. A scene change can be detected by referring to information such as scene change information added to a video stream in digital video, the starting position of a GOP (Group of Picture) in a coded stream such as an MPEG code stream, or navigation data for playing back a stream. If a scene change is not detected at step S204, the process proceeds to step S205 and the process will end with inputting the image of the reference picture. If a scene change is detected, the process proceeds to step S206, where it is determined that the current reference target picture is not to be chosen as a picture to be referred to, then the process proceeds to step S207. At step S207, determination is made as to whether the current reference target picture is displayed subsequent to the k-th picture. If the reference picture precedes, the process proceeds to step S208; otherwise the process proceeds to step S209. At step S208, it is determined that only the k+1-th and subsequent pictures in the display order are to be referred to, and then the process proceeds to step S210, where k_plus is set to 1. At step S209, it is determined that only the k−1 picture and the preceding pictures in the display order are to be referred to, and then the process proceeds to step S211, where k_minus is set to 1. After the completion of step S210 or S211, the process proceeds to step S212, where determination is made as to whether both k_plus and k_minus are 1. If so, the process will end. If at least one of them is 0, the process returns to step S203. It should be noted that when the beginning or end of a stream in motion video is encountered and an additional picture to be referred to cannot be obtained, the process will end. Step S202 may be performed only at the start of the super resolution process. If N pictures to be referred to are input at a time as in step S101 of FIG. 10, steps S201 through S212 are repeated until N reference pictures are chosen. Input of reference pictures may be discontinued when processing using the N reference pictures is completed, rather than continuing the processing until the N reference pictures are chosen. That is, input of reference pictures may be discontinued after the processes from step S203 through S212 on the N pictures is completed. If the order in which the pictures included in a coded stream differs from the order in which they are decoded, as in bidirectional predictive pictures in MPEG-2 video or bi-predictive picture in MPEG-4 AVC (Advanced Video Coding), the order in which the pictures are displayed is obtained beforehand.

While repetition processing is used in the reconstruction of the picture in the examples, the high-resolution picture may be generated by using other method. For example, inverse filtering may be applied after re-sampling.

While low-resolution pictures are used, super-resolved pictures may be used as reference pictures. Especially when a stream of motion video is to be sequentially super-resolved, super-resolved pictures can be used as reference pictures.

Also, the number of reference pictures to be positioned may be preset and additional reference pictures to be referred to may be selectively determined. For example, at least four reference pictures may be positioned and the fifth and subsequent reference pictures may or may not be referred to depending on determination made using the method according to the present embodiment. Thus, processing required for determining whether motion estimation should be ended can be omitted for the minimum number of the reference pictures required for positioning.

As has been described, the image processing method of the present embodiment includes the step S105 of determining whether block or picture motion estimation and positioning processing on each reference picture should be ended so that motion estimation and positioning processing are performed only on regions where positioning of reference pictures is needed. Therefore, the amount of computation required for motion estimation, which involves a large computational load, can be reduced. Furthermore, by input reference pictures as needed, the memory required for holding reference pictures can be reduced and pictures of the same scene to be positioned can be readily selected.

Second Embodiment

An image processing device 200 according to a second embodiment differs from that of the first embodiment in that a second repetition processing unit includes a determination unit which determines from the result of update processing those pixels that satisfy completion conditions and an exclusion unit which excludes the pixels determined to satisfy the completion conditions. Thus, the update processing is not performed on all pixels of a high-resolution picture but only on the pixels remaining after the exclusion by the exclusion unit. By excluding the pixels that satisfy the completion conditions from the update processing, the amount of computation required for repetitive update processing can be reduced. Because the pixels excluded satisfy the completion conditions, the exclusion does not degrade image quality.

Figure 16:
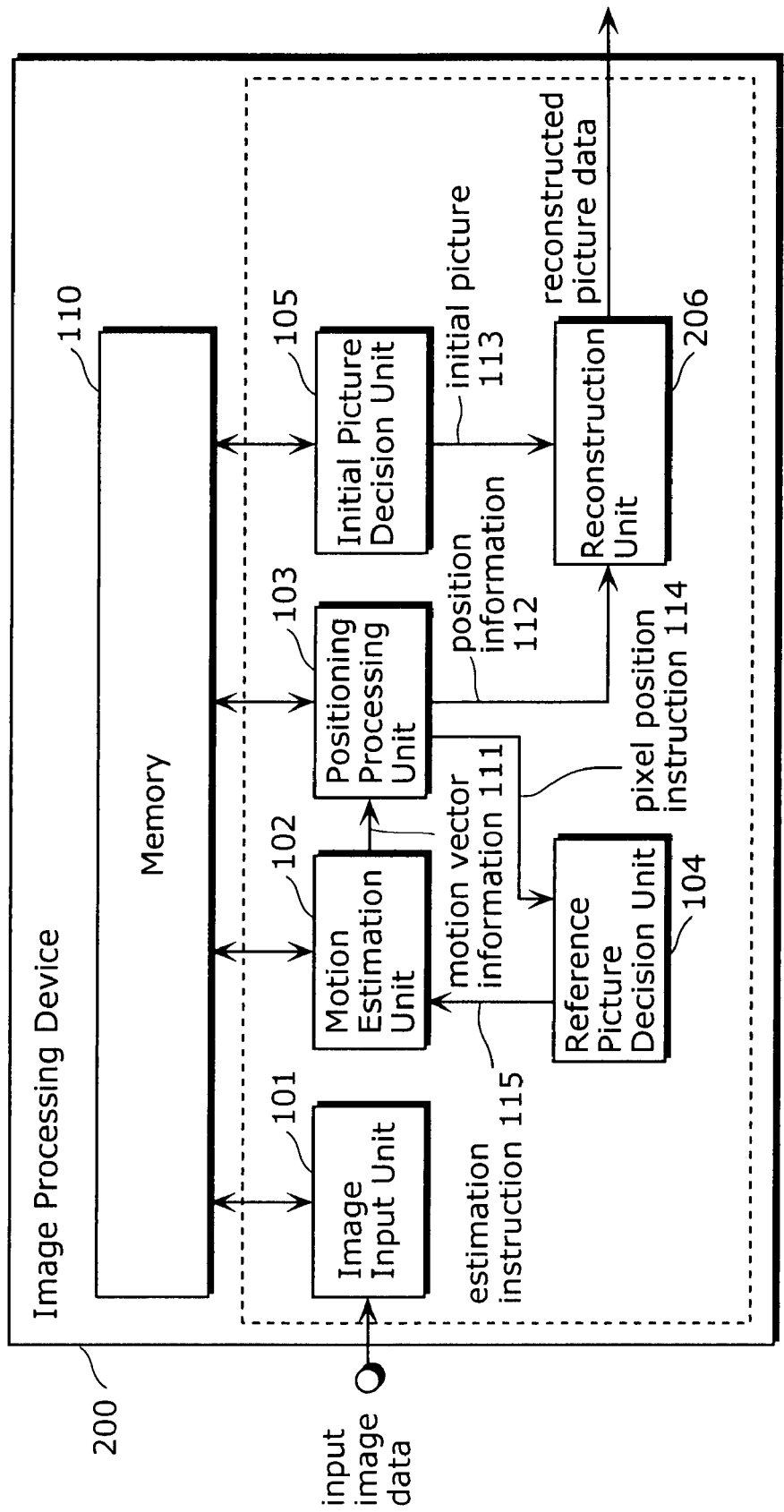
FIG. 16 is a block diagram showing a configuration of an image processing device according to a second embodiment of the present invention.

FIG. 16 is a block diagram showing a configuration of the image processing device 200. The image processing device 200 includes an image input unit 101, a motion estimation unit 102, an positioning unit 103, a reference image decision unit 104, an initial picture decision unit 105, a reconstruction unit RECON 2, and a memory 110.

The image input unit 101 stores input image data IMGin in the memory 110. The motion estimation unit 102 retrieves image data required for motion estimation from the memory 110, uses it to perform motion estimation, and inputs motion vector information 111 obtained through the motion estimation into the positioning unit 103. The positioning unit 103 then performs positioning based on the motion vector information 111 and outputs the result as position information 112. The initial picture decision unit 105 generates an initial high-resolution picture 113. The reconstruction unit 206 performs repetition processing based on the position information 112 and the initial picture 113, selectively updates pixel values of a high-resolution picture, and generates and outputs reconstructed picture data.

Figure 17:
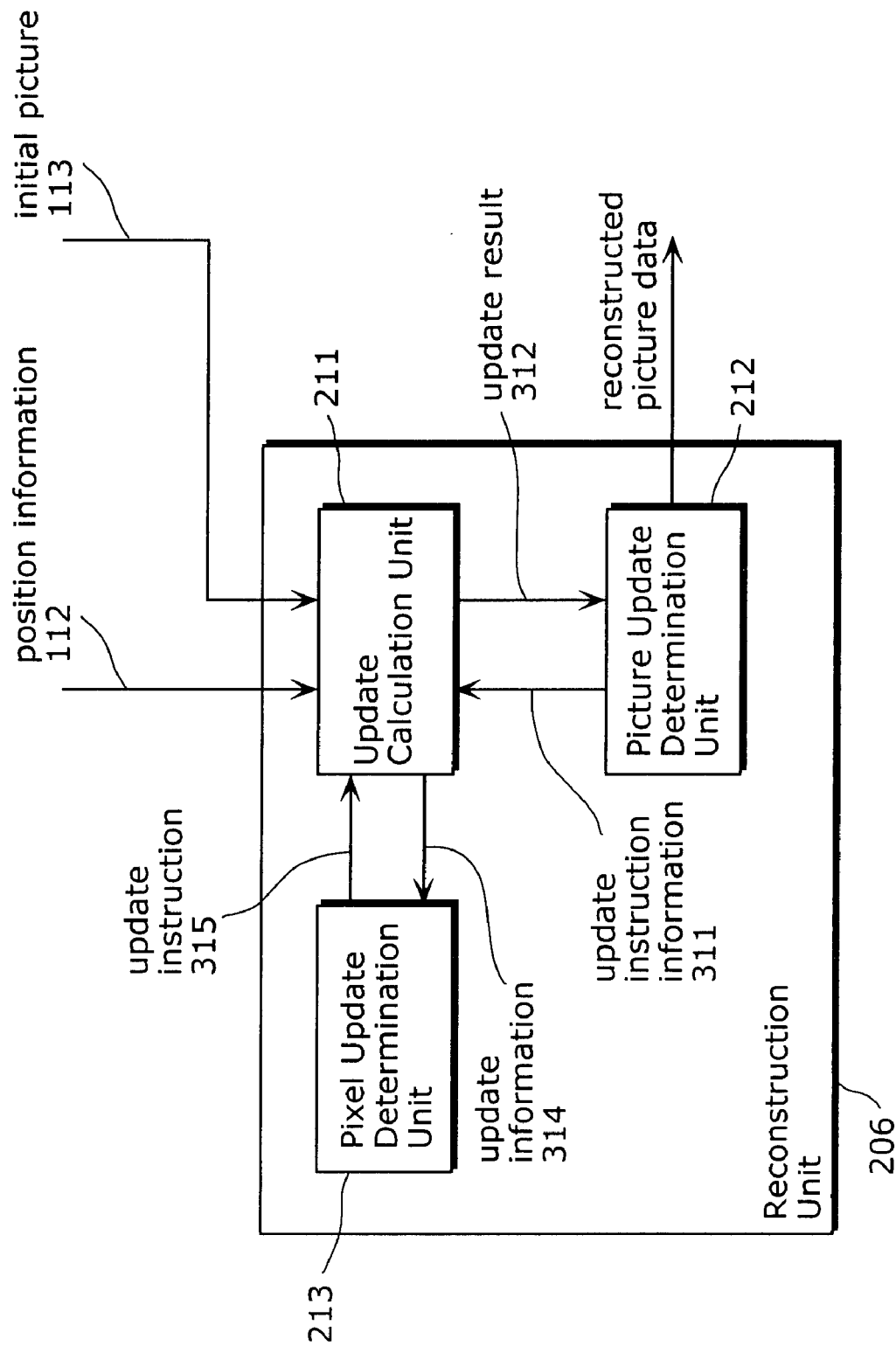
FIG. 17 is a block diagram showing a configuration of a reconstruction unit of the image processing device according to the second embodiment.

FIG. 17 is a block diagram showing a configuration of the reconstruction unit 206. The reconstruction unit 206 includes a reconstruction calculation unit 211, a picture update determination unit 212, and a pixel updates determination unit 213. The update calculation unit 211 update pixel values of a high-resolution picture on the basis of the position information 112 and the initial picture 113 in accordance with a picture update instruction 311 input from the picture update determination unit 212 and a pixel update instruction 315 input from the pixel update determination unit 213. The picture update determination unit 212 determines from the result of update 312 of the high-resolution picture whether repetition processing should be ended. If it determines that the repetition processing should be ended, the picture update determination unit 212 outputs high-resolution picture data; if it determines that the repetition processing should be continued, the picture update determination unit 212 issues an update instruction 311 to direct the update calculation unit 211 to update the high-resolution picture. The pixel update determination unit 213 determines on the basis of pixel update information 314 for a high-resolution picture that is input from the update calculation unit 211 whether pixel updating should be ended and, if so, inputs an update instruction 315 into the update calculation unit 211.

Operation of the image processing device 200 according to the second embodiment of the present invention will be described below. The image processing device 200 differs from the image processing device 100 in that when pixel values of a high-resolution picture are updated in the repetition processing at step S005, pixels whose pixel values are to be updated are selectively determined.

Figure 18:
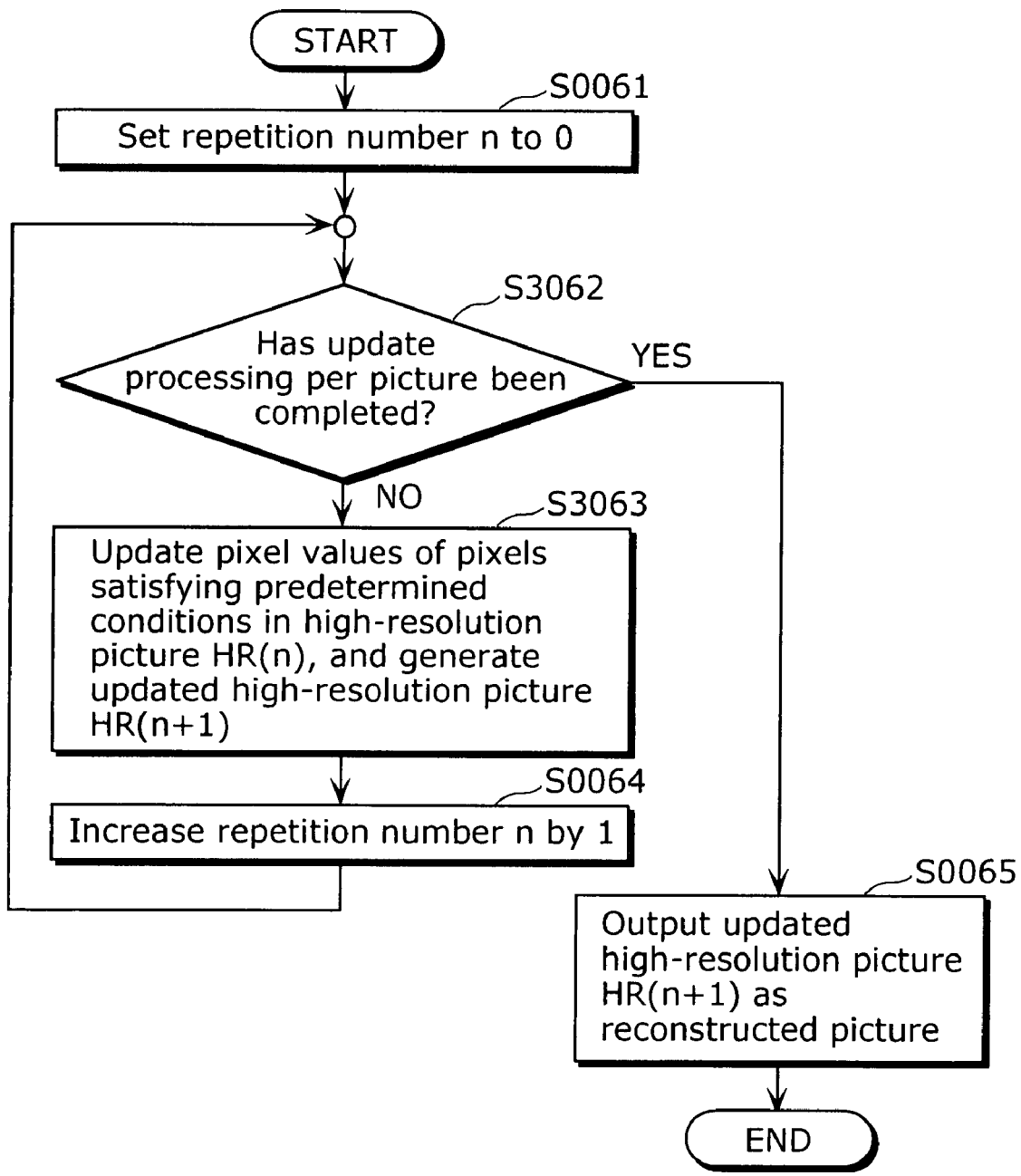
FIG. 18 is a flowchart showing repetition processing in the image processing device according to the second embodiment.

FIG. 18 is a flowchart showing repetition processing performed in the image processing device 200. At step S0061, the number n of repetitions is set to 0. At step S3062, determination is made as to whether the repetition processing should be ended. If the L2 norm of the gradient I' of an evaluation function is less than a predetermined threshold value $\epsilon$, the repetition processing is ended and the process proceeds to step S0065, where a high-resolution picture HR (n+1) is output as a reconstructed picture. If the L2 norm of the gradient I' of the evaluation function is greater than or equal to the threshold value $\epsilon$, the process proceeds to step S3063. At step S3063, the pixel values of only those pixels in the high-resolution picture HR (n) that satisfy a predetermined condition are updated to generate an updated high-resolution picture HR (n+1). Here, the high-resolution picture HR (0) agrees with the initial high-resolution picture 113 generated at step S005. Then, 1 is added to the repetition counts at step S0064 and the process returns to step S3062.

The pixels that satisfy the predetermined condition at step S3063 are those pixels whose update completion flags RepFlag (i, j) are 0. The update completion flags are associated with individual pixels. In update processing at step S3063, pixel data whose update completion flags RepFlag are 1, that is, pixel data that satisfies the update completion condition is excluded from the elements of the vector h_vec (i) in (equation 2). Consequently, the amount of computation required for the update processing is significantly reduced.

Figure 19:
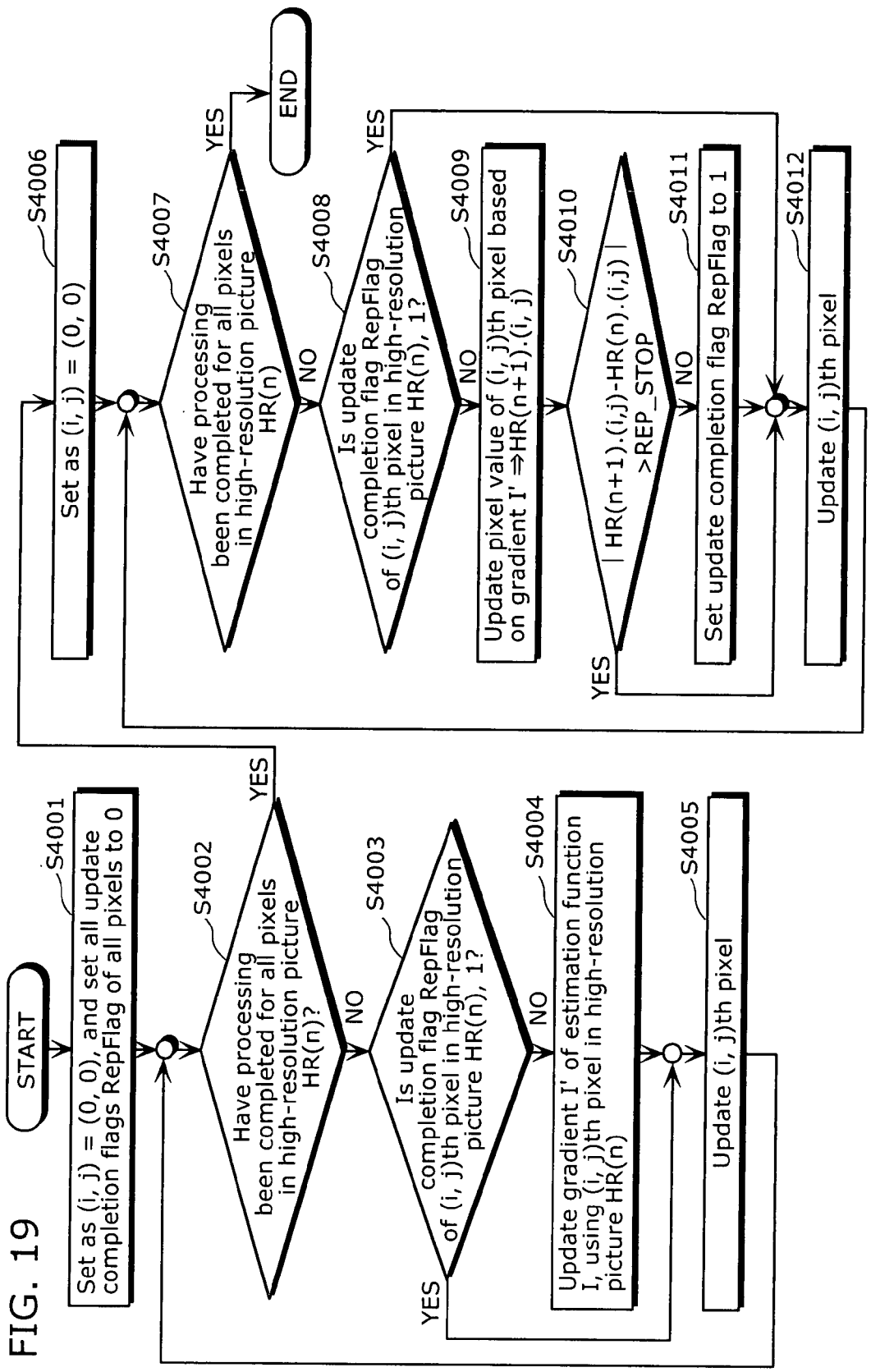
FIG. 19 is a flowchart showing an operation for determining whether a pixel-wise update has been completed in the image processing device according to the second embodiment.

FIG. 19 is a flowchart showing details of the operation at step S3063. The operation broadly includes two parts: the steps of calculating the gradient I' (equation 2) of the evaluation function I (equation 1) (steps S4001 through S4005) and the steps of updating pixel values of a high-resolution picture on the basis of the calculated gradient I' (steps S4006 though S4012).

The part for calculating the gradient I' of the evaluation function I will be described first. At step S4001, index numbers i and j indicating each pixel of the high-resolution picture HR (n) are set to 0 and the update completion flags RepFlag of all pixels are also set to 0. Then, determination is made at step S4002 as to whether processing for all pixels of the high-resolution picture HR (n) has been completed. If it is determined that the processing for all pixels has been completed, the process proceeds to step S4006; otherwise, the process proceeds to step S4003. At step S4003, determination is made as to whether the update completion flag RepFlag (i, j) indicating whether the pixel value of the pixel (i, j) of HR (n) should be ended is 1. If the flag is 1, the process proceeds to step S4005. If it is 0, the process proceeds to step S4004. At step S4004, the pixel value of the pixel (i, j) of HR (n) is used to update the value of the gradient I' (equation 2) of the evaluation function I (equation 1) and then the process proceeds to step S4005. At step S4005, (i, j) is updated and the process returns to step S4002.

Then, the pixel values of the high-resolution picture are updated according to the calculated gradient I'. First, i and j are set to 0 at step S4006. Then, determination is made at step S4007 as to whether the processing for all pixels of the high-resolution picture HR (n) has been completed. If it is determined that the processing has been completed, the update processing of the pixel values of HR (n) is ended. If it is determined that the update processing has not been completed, the process proceeds to step S4008, where determination is made as to whether the update completion flag RepFlag (i, j) of the pixel (i, j) of HR (n) is 1. If it is 1, the process proceeds to step S4012; If 0, the process proceeds to step S4009. At step S4009, the value of the pixel (i, j) is updated on the basis of the gradient I' to obtain an updated pixel value HR (n+1). (i, j), then the process proceeds to step S4010. At step S4010, determination is made as to whether the absolute value of the difference between the updated pixel value HR (n+1).(i, j) and the previous pixel value HR (n).(i, j) is greater than a threshold value REP_STOP that indicates whether update of the pixel value should be ended. If it is greater than the threshold value REP_STOP, the process proceeds to step S4012; otherwise the process proceeds to step S4011. It is assumed here that the threshold value REP_STOP is a predetermined value. At step S4011, the update completion flag RepFlag (i, j) is set to 1 and then the process proceeds to step S4012. Lastly, (i, j) is updated at step S4012 and then the process returns to step S4007.

While the pixel values are updated after the gradient I' (equation 2) of the evaluation function I (equation 1) for all pixels are calculated, the pixel values of the pixels (i, j) of the high-resolution picture HR (n) may be updated upon completion of the gradient I' for the pixels that affect the pixels (i, j) of the high-resolution picture HR (n). The pixels that affects the pixels (i, j) of the high-resolution picture HR (n) are determined by the size of the kernel b_vec(i) indicating an imaging model in Equation (1). For example, if the size of the kernel b_vec is 7×7, the pixel values of the pixels (i, j) of the high-resolution picture HR (n) can be updated after the gradients I' for 7×7 pixels around the pixel (i, j) are updated. By sequentially updating pixel values in this way, the calculation of the gradient I' and the update processing can be performed concurrently.

Figure 8:
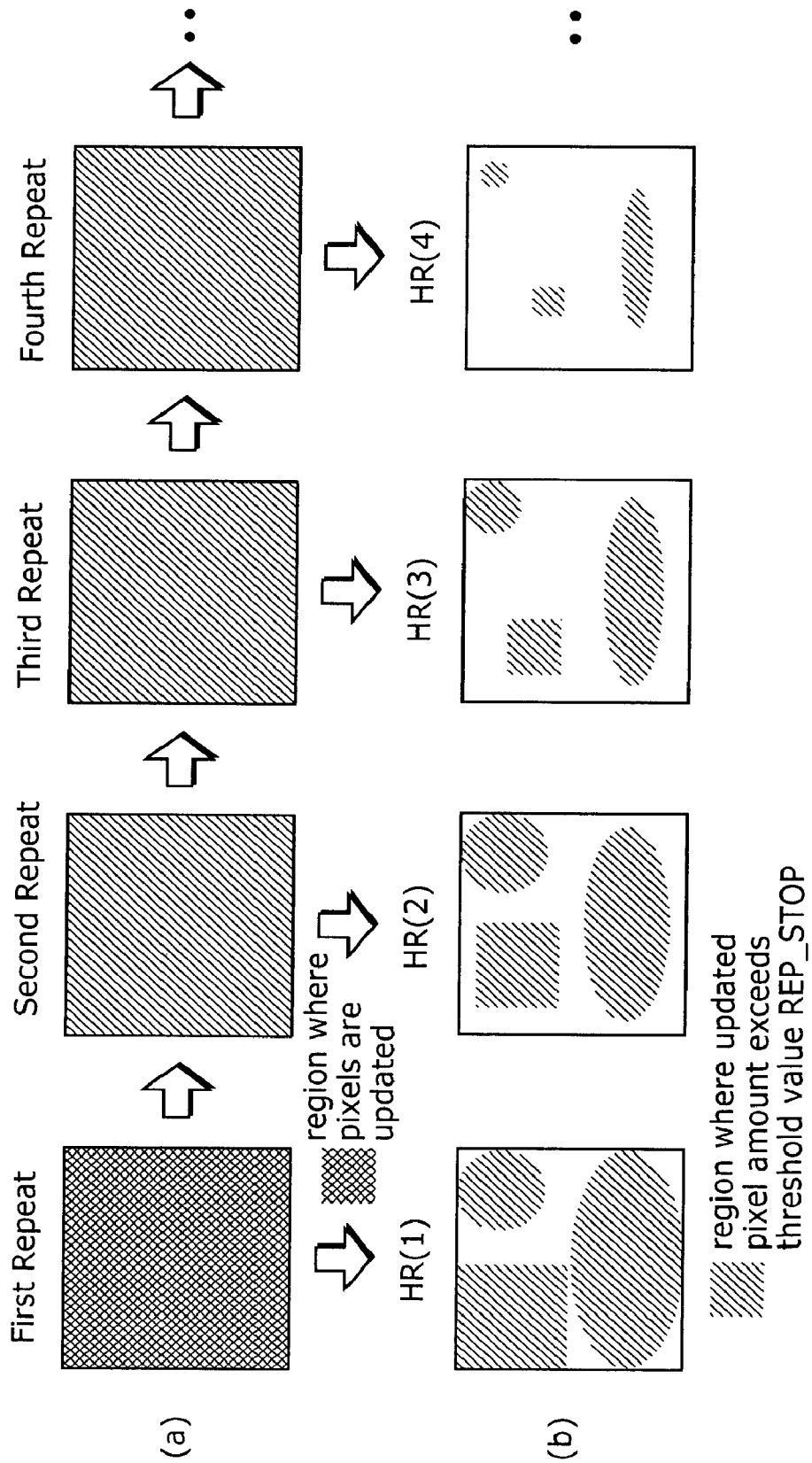
FIG. 8 is a diagram showing a problem with the repetition processing in the conventional reconstruction-based super resolution.
Figure 20:
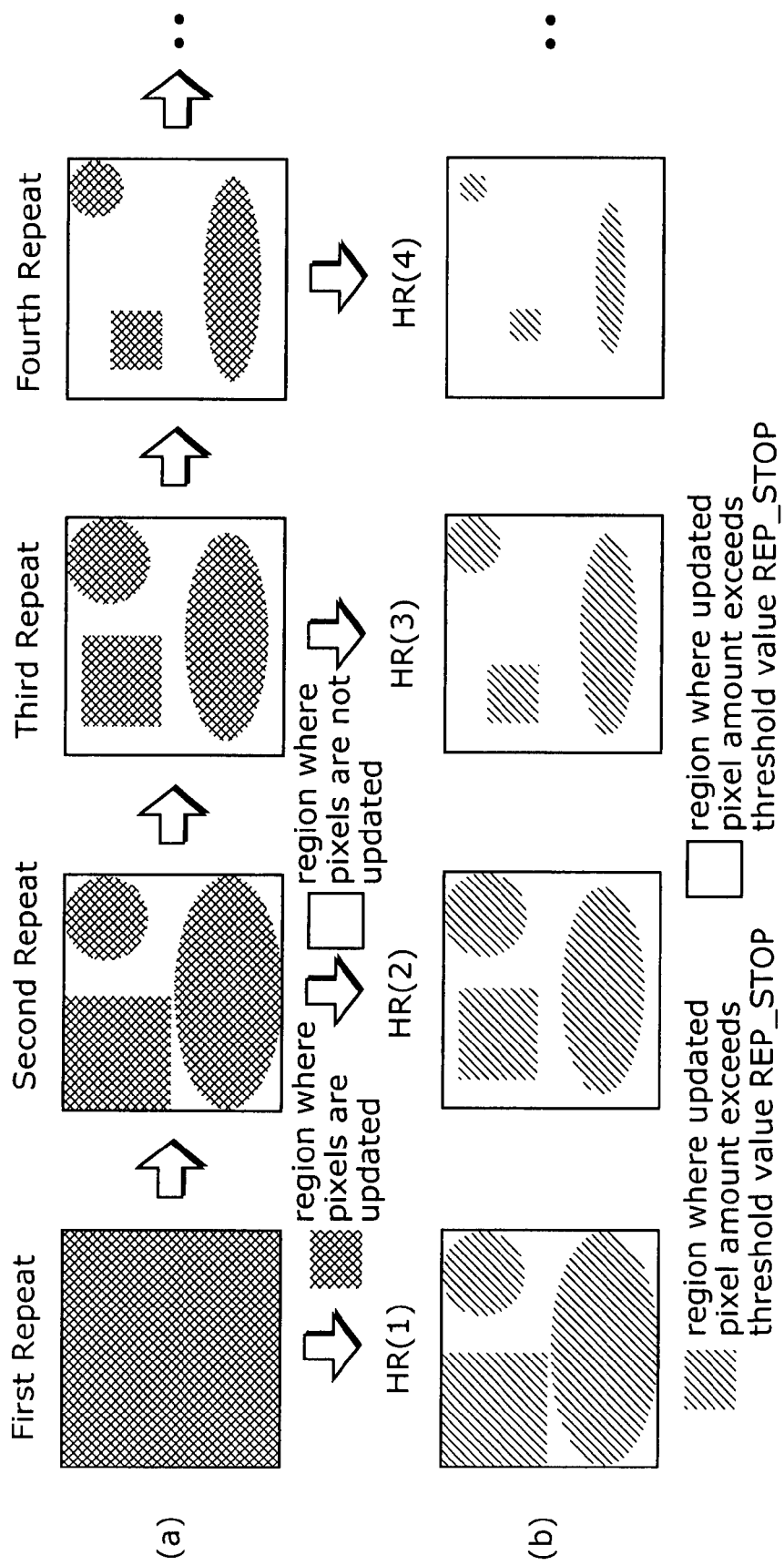
FIG. 20 is a diagram illustrating an effect of the image processing device according to the second embodiment.

FIG. 20 is a diagram illustrating an effect of the image processing method according to the second embodiment. Parts (a) and (b) of FIG. 20 correspond to parts (a) and (b) of FIG. 8. In the conventional method, the pixel values of all pixels of a high-resolution picture are updated regardless of the number of repetitions as shown in FIG. 8(a). In the method of the present embodiment, in contrast, pixels whose pixel values need to be update are determined in each repetition as shown in FIG. 20(a). Therefore, the number of pixels whose values are to be updated decreases in each succeeding repetition as shown in FIG. 20(a). Consequently, the amount of computation required for updating pixel values in a region where updates of pixel values do not needed (the white region 1001 in FIG. 20(a)) can be reduced, as compared with the conventional method.

Variations of the second embodiment will be described below.

While the threshold value REP_STOP indicating whether update of pixel values should be ended is a preset fixed value in step S4010, the threshold value may be dynamically set as described under items 1 to 3, for example.

1. The threshold value REP_STOP is set such that the percentage of pixels in a high-resolution picture whose pixel values are updated becomes approximately equal to a predetermined value in the M-th repetition (where M is an integer greater than or equal to 1). For example, the threshold value REP_STOP is set such that the percentage of pixels updated in the second repetition becomes 80% or less. The threshold value may be fixed throughout repetition processing or may be changed in each iteration of the loop of the repetition processing. Alternatively, an identical threshold value may be used in the same scene and a new threshold value may be re-set at each scene change. Furthermore, the predetermined percentage may be set to a higher value in a region in a high-resolution picture where there is much high-frequency component or may be otherwise changed in accordance with the nature of a picture. By limiting the percentage of pixels whose pixel values are updated in this way, the amount of computation can be effectively reduced.

2. The threshold value is changed in accordance with the image quality of a reconstructed picture. For example, if a high-image-quality mode and a low-image-quality mode are available, a lower threshold value REP_STOP than that for the low-image-quality mode may be set for the high-image-quality mode.

3. The threshold value is changed in accordance with the nature of a picture. For example, a lower threshold value REP_STOP may be set for a picture that contains more high-frequency component than that for a picture that contains less high-frequency component. The threshold value may be changed for each picture or each region in a picture.

While the repetition processing is ended if the L2 norm of the gradient I' of the evaluation function is less than the predetermined threshold value ε at step S3062, the determination may be based on the difference between an updated high-resolution picture HR (n) and the original high-resolution picture HR (n−1), that is, a variation of updated amount. Here, n is greater than or equal to 1 because at least one iteration of the repetition processing is performed. FIG. 11 is a flowchart showing an exemplary operation for making determination based on a variation in updated amount. First, variables i, j, DIFF, and SUM are all set to 0 at step S5001. Determination is made at step S5002 as to whether the processing for all pixels of a high-resolution picture HR (n) has been completed. If it is determined that the processing has been completed, the process proceeds to step S5006; otherwise the process proceeds to step S5003. At step S5003, determination is made as to whether the update completion flag RepFlag (i, j) at a pixel (i, j) of the high-resolution picture HR (n) is 1. If the update completion flag RepFlag (i, j) is 1, the process proceeds to step S5005; if the update completion flag RepFlag (i, j) is 0, the process proceeds to step S5004. At step S5004, the absolute value of the difference between the updated pixel value HR (n).(i, j) in the high-resolution picture and the previous pixel value HR (n−1).(i, j) in the high-resolution picture is added to the variable DIFF and the pixel value HR (n−1). (i, j) of the high-resolution picture before the update is added to the variable SUM, and then the process proceeds to step S50056. At step S5005, (i, j) is updated and then the process returns to step S5002. At step S5006, determination is made as to whether DIFF divided by SUM is greater than a threshold value REP_THR. If it is greater than the threshold value REP_THR, the process proceeds to step S5008, where it is determined that the picture-by-picture repetition processing should be continued. If it is less than or equal to the threshold value REP_THR, the process proceeds to step S5007, where it is determined that the picture-by-picture repetition processing should be ended. Here, the threshold value REP_THR is a predetermined value. The variable DIFF divided by the variable SUM is compared with the threshold value REP_THR and, if the proportion of the amount of updated pixel values to the pixel values HR (n−1) .(i, j) in the high-resolution picture before the update is less than a predetermined value, the repetition processing is ended in this method. However, the repetition processing may be ended when the value of the variable DIFF becomes less than a predetermined threshold value. In this case, determination as to whether the repetition processing should be ended or not can be made without depending on the pixel value HR (n−1) .(i, j) of the high-resolution picture before update.

Figure 21:
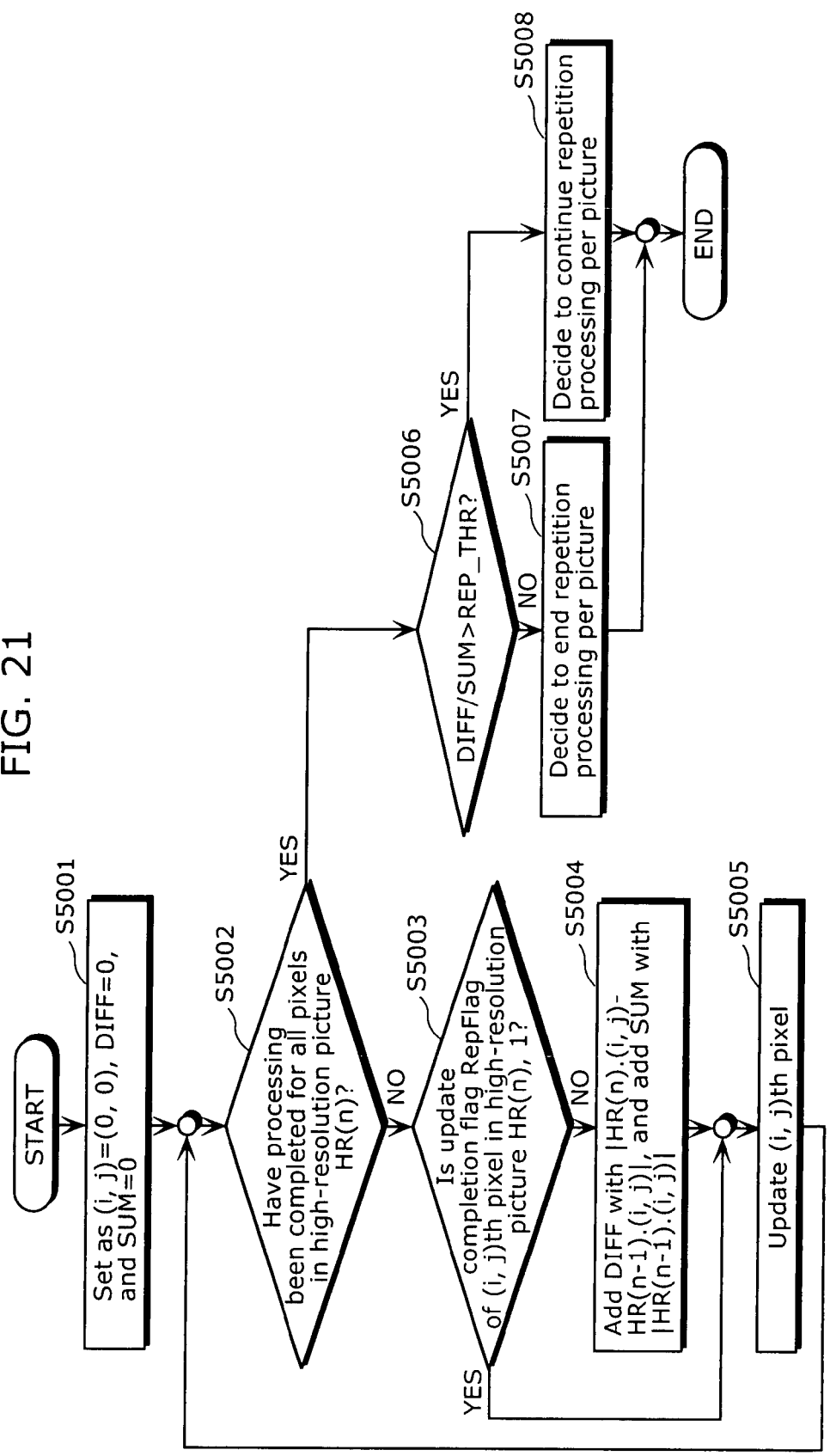
FIG. 21 is a flowchart showing an operation for determining whether a picture-wise update has been completed in the image processing device according to the second embodiment.

While only the pixels whose update completion flags RepFlag are 0 are used in the calculations of the variables DIFF and SUM in the method shown in FIG. 21, information concerning pixels whose RepFlags are 1 may be reflected in the calculations. In this case, the amount of computation increases if the portion of the gradient I' that relates to an error term is calculated for the pixels whose RepFlags are 0. Therefore, for those pixels, the pixel value immediately before their RepFlag changed to 1 and the amounts of the update of the pixel values may be used. This method is also applicable in updating the gradient I' at step S3063.

While the error terms in Equations (1) and (2) are calculated for all pixels after positioning, the error terms may be calculated for each of the grids that separate pixels of the high-resolution picture. The average value of the pixel values of the low-resolution pictures positioned in each grid is used as the representative value. Furthermore, the elements of the error terms are calculated from the difference between the representative value at a pixel position of a grid, which may be the pixel value of the pixel position at the center of the grid, and the result of applying the kernel of the vector b_vec corresponding to the representative position of the pixel values to the vector h_vec of the pixel values of the high-resolution picture.

Update flag RepFlag information indicating whether update of pixel values is required may be held on a block-by-block basis or on an object-by-object basis, instead of pixel-wise. Determination as to whether updates of pixel values in that region is required is made from the total of DIFF/SUM (variable DIFF divided by variable SUM) of the pixel values in the region or from the total of DIFF. By holding update information on a region-by-region basis, the memory required for holding update information can be reduced.

A method other than MAP may also be used for the repetition processing. The evaluation function that can be used is not limited to the form represented by Equation (1). For example, the ML (Maximum Likelihood) method may be used, in which only the error term of the (equation 1) is used as the evaluation function. Alternatively, a weight may be assigned to the error term of Equation (1).

As has been described, the image processing method according to the second embodiment includes the step S3063 of determining whether repetition processing on each pixel should be ended and if the pixel value of the pixel can be considered to have converged, update of the pixel value can be ended. Therefore, the amount of repetition processing can be reduced without degrading the image quality of the reconstructed picture.

Variations of the first and second embodiments will be described below.

In the first and second embodiments, low-resolution pictures may have the same resolution as that of a high-resolution picture. In that case, the enlargement factor is 1 and therefore the resolution is not increased. However, high-frequency component is restored through reconstruction processing and accordingly the picture quality is improved.

The motion estimation and positioning methods of the first embodiment may be used in combination with the repetitive method of the second embodiment.

While the initial high-resolution picture is generated by interpolation of pixels of a target picture for super resolution in the first and second embodiments, the initial high-resolution picture may be generated by interpolation of positioned pixels after positioning reference pictures. If the accuracy of the positioning is high, the number of repetitions can be reduced because a picture closer to the original high-resolution picture can be used as the initial value by using the positioned pixels.

The application of the method is not limited to motion video. For example, super resolution using still pictures taken at different shooting positions (multi-view) is also possible. In the case of still pictures, the motion amount used in the foregoing description corresponds to the amount of displacement between pictures and the motion estimation corresponds to estimation of the amount of displacement.

Third Embodiment

By recording a program for implementing any of the image processing methods of the embodiments described above on a recording medium such as a flexible disk, the processing given in any of the embodiments can be readily performed on a stand-alone computer system.

Figure 22A:
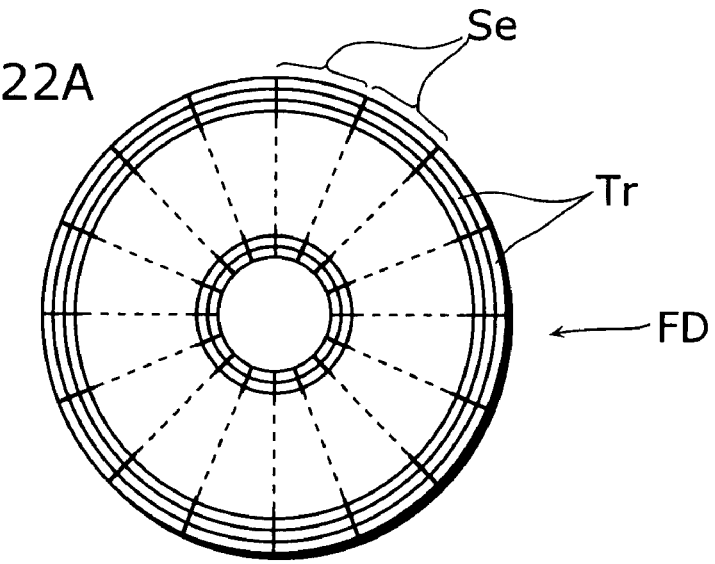
FIG. 22A is a diagram showing an exemplary physical format of a flexible disk which is a recording medium.
Figure 22B:
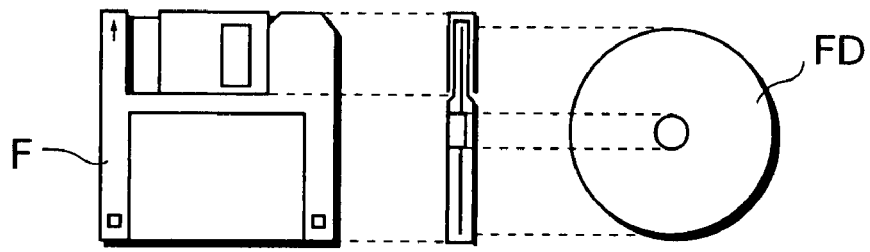
FIG. 22B is a diagram showing an external view of a flexible disk viewed from the front, a cross-section of the flexible disk, and a view of the flexible disk.

FIGS. 22A to 22B are diagrams illustrating a case where any of the image processing methods of the embodiments described above is implemented by a computer system using a program recorded on a recording medium such as a flexible disk.

FIG. 22B shows an external view of a flexible disk in jacket viewed from the front, a cross-section of the flexible disk in jacket, and a view of the flexible disk. FIG. 22A shows an exemplary physical format of the flexible disk, which is a recording medium. The flexible disk FD is enclosed in a jacket F. On the surface of the flexible disk, multiple tracks Tr are formed concentrically from the outer edge toward the center of the disk. Each track is angularly divided into 16 sectors Se. The program is recorded in a region on the flexible disk FD assigned to the program on flexible disk FD.

Figure 22C:
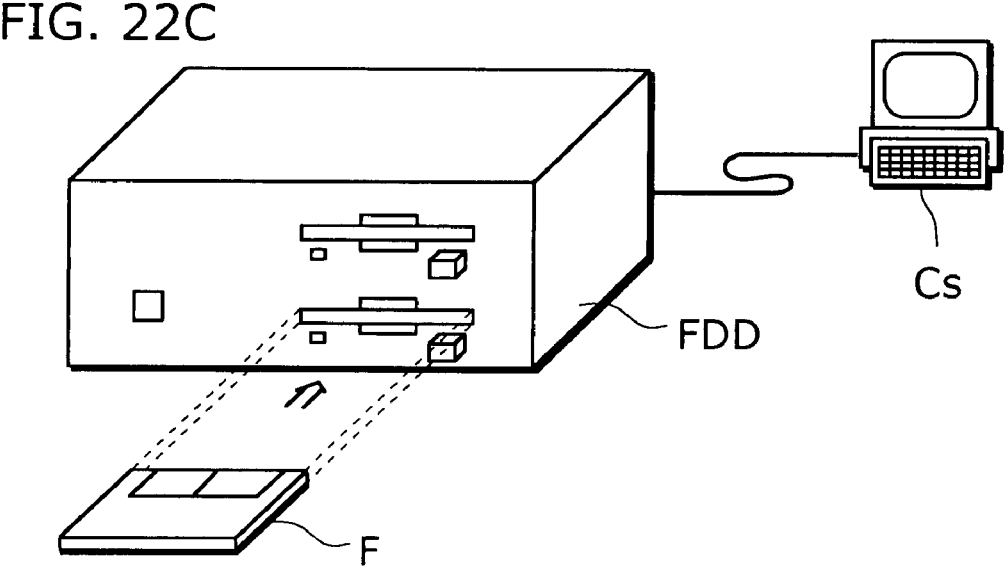
FIG. 22C is a diagram showing a configuration of a device that writes and reads a program on the flexible disk FD.

FIG. 22 C shows a configuration for recording and reading the program on the flexible disk FD. To record the program for implementing the image processing method on the flexible disk FD, the program is written from a computer system Cs through a flexible disk drive. To build the image processing method for implementing the method by the program on the flexible disk in a computer system, the program is read and transferred by the flexible disk drive to the computer system.

While a flexible disk is used as the recording medium in the forgoing description, an optical disk may be used as well. Any other recording media, such as an IC card and a ROM cassette, on which the program can be recorded can be used as well.

While the image processing device and image processing method according to the present invention have been described above with respect to the embodiments, the present invention is not limited to these embodiments. Variations of the embodiments that occur to those skilled in the art are also included in the present invention without departing from the spirit and the scope of the present invention.

For example, it will be obvious that an optical disk recording device, motion video transmitter, digital television broadcasting devices, Web servers, communication devices, portable information terminals that include the image processing device according to any of the present embodiments and a motion video receiver, a motion video recording devices, still image recording devices, digital television receiving devices, communication devices, and portal information terminals that include the image processing device according to any of the present embodiments are included in the present invention. The motion video recording devices include camcorders and Web recorders; the still image recording devices include digital still cameras.

The functional blocks shown in the block diagrams (such as exemplary embodiments without materially departing from the novel teachings and advantages of this invention. Accordingly, all such modifications are intended to be included within the scope of this invention.

What is claimed is:

1. An image processing device which uses a representative picture having a first resolution and a plurality of reference pictures having the first resolution that are related to the representative picture to generate a target high-resolution picture having a second resolution higher than the first resolution, said image processing device comprising:
    a first repetition processing unit that performs positioning processing for a reference picture from among the plurality of reference pictures, said first repetition processing unit repeatedly performing the positioning processing while switching from one reference picture to another reference picture;
    a first determination unit that determines whether or not the positioning processing has been performed for all of the plurality of reference pictures; and
    a second repetition processing unit that repeats update processing for updating a value of a pixel in the target high-resolution picture after completion of the positioning processing performed by said first repetition processing unit;
    wherein, in the positioning processing, an amount of displacement of the reference picture from the representative picture is estimated, and based on the estimated amount of displacement, a pixel of the reference picture is positioned at a sub-pixel position in a high-resolution picture produced by enlarging the representative picture,
    wherein, in the update processing, the estimated value of the pixel in the target high-resolution picture is updated so that a value of an evaluation function is decreased, the evaluation function including, as a variable, a difference between a value of a pixel in the reference pictures after the positioning processing and the estimated value of the pixel in the target high-resolution picture, and
    wherein at least one of said first and second repetition processing units includes:
        a second determination unit that determines whether a pixel satisfies a completion condition from a result of one of the positioning processing and the update processing; and
        an exclusion unit that excludes the pixel that is determined to satisfy the completion condition from one of the positioning processing and the update processing.

2. The image processing device according to claim 1, wherein said first repetition processing unit includes:
    a motion estimation unit that estimates motion of the reference picture with respect to the representative picture for each block of the representative picture; and
    a positioning unit that divides the high-resolution picture into a plurality of grids corresponding to pixels in the target high-resolution picture, and that positions pixels from reference pictures at a sub-pixel position in each block in accordance with the estimated motion,
    wherein said second determination unit determines that a block satisfies the completion condition when a proportion of grids in the block containing one or more pixels from one or more reference pictures to all grids in the block exceeds a predetermined value, and
    wherein said exclusion unit excludes pixels of the block that is determined to satisfy the completion condition from the positioning processing.

3. The image processing device according to claim 2, wherein said motion estimation unit estimates motion of one or more reference pictures in a sequence starting from a reference picture that is closest to the representative picture in an order in which the one or more reference pictures are displayed.

4. The image processing device according to claim 1, wherein said second repetition processing unit includes
    an update unit that updates the estimated pixel value so as to decrease the value of the evaluation function,
    wherein said second determination unit determines that a pixel satisfies the completion condition when an amount of the update, which is a difference between the value of the pixel before the update and the value of the pixel after the update, is equal to a threshold value, and
    wherein said exclusion unit excludes the pixel that is determined to satisfy the completion condition from the update processing.

5. The image processing device according to claim 1, further comprising
    a judgment unit that judges whether or not a reference picture belongs to the same scene to which the representative picture belongs,
    wherein said motion estimation unit excludes the reference picture that belongs to a different scene from motion estimation.

6. An image processing device which uses a representative picture having a first resolution and a plurality of reference pictures having the first resolution that are related to the representative picture to generate a target high-resolution picture having a second resolution higher than the first resolution, said image processing device comprising:
    a first repetition processing unit that performs positioning processing for a reference picture from among the plurality of reference pictures, said frist repetition processing unit repeatedly performing the positioning processing while switching from one reference picture to another reference picture;

a first determination unit that determines whether or not the positioning processing has been performed for all of the plurality of reference pictures; and a second repetition processing unit that repeats update processing for updating an estimated value of a pixel in the target high-resolution picture after completion of the positioning processing performed by said first repetition processing unit, wherein, in the positioning processing, an amount of displacement of the reference picture from the representative picture is estimated, and based on the estimated amount of displacement, a pixel of the reference picture is positioned at a sub-pixel position in a high-resolution picture produced by enlarging the representative picture, wherein, in the update processing, the estimated value of the pixel in the high-resolution picture is updated so that a value of an evaluation function is decreased, the evaluation function including, as a variable, a difference between a value of a pixel in the reference pictures after the positioning processing and the estimated value of the pixel in the target high-resolution picture model, wherein said first repetition processing unit includes:
a motion estimation unit that estimates the motion of the reference picture with respect to the representative picture;
a positioning unit that positions a pixel of the reference picture at a sub-pixel position of the high-resolution picture in accordance with the estimated motion;
a second determination unit that determines whether a pixel satisfies a completion condition from a result of the positioning processing; and
an exclusion unit that excludes the pixel determined to satisfy the completion condition from the positioning processing.

7. The image processing device according to claim 6,
wherein said second determination unit estimates motion of each block of the representative picture with respect to the reference picture,
wherein said positioning unit divides the high-resolution picture into a plurality of grids corresponding to the pixels of the high-resolution picture, and positions a pixel of the reference picture in a sub-pixel position of the high-resolution picture on a block-by-block basis in accordance with the estimated motion,
wherein said second determination unit determines whether the reference picture satisfies the completion condition when a proportion of grids containing one or more pixels from the reference pictures to all of the plurality of grids in the high-resolution picture exceeds a predetermined value, and
wherein said exclusion unit excludes pixels of remaining reference pictures from the positioning processing when said determination unit determines that the reference picture satisfies the completion condition.

8. The image processing device according to claim 6,
wherein said second determination unit estimates motion of each block of the representative picture with respect to the reference picture,
wherein said positioning unit divides the high-resolution picture into a plurality of grids corresponding to the pixels of the high-resolution picture, and positions a pixel of the reference picture in a sub-pixel position of the high-resolution picture on a block-by-block basis in accordance with the estimated motion,
wherein said second determination unit determines whether a block satisfies the completion condition when a proportion of grids containing one or more pixels from one of more reference pictures to all grids in the block exceeds a first predetermined value, and
wherein said exclusion unit excludes pixels of the block determined to satisfy the completion condition from the positioning processing of the subsequent repetitions.

9. The image processing device according to claim 8,
wherein said second determination unit excludes pixels of remaining reference pictures from the positioning processing when a proportion of the number of blocks determined to satisfy the completion condition to the number of all blocks in the high-resolution picture exceeds a second predetermined value.

10. An image processing device which uses a representative picture having a first resolution and a plurality of reference pictures having the first resolution that are related to the representative picture to generate a target high-resolution picture having a second resolution higher than the first resolution, said image processing device comprising:
a first repetition processing unit that performs positioning processing for a reference picture from among the plurality of reference pictures, said first repetition processing unit repeatedly performing the positioning processing while switching from one reference picture to another reference picture;
a first determination unit operable to determine whether or not the positioning processing has been performed for all of the plurality of reference pictures; and
a second repetition processing unit that repeats update processing for updating an estimated value of a pixel in the target high-resolution picture after completion of the positioning processing performed by said first repetition processing unit,
wherein, in the positioning processing, an amount of displacement of the reference picture with respect to the representative picture is estimated, and based on the estimated amount of displacement, a pixel of the reference picture is positioned at a sub-pixel position in a high-resolution picture produced by enlarging the representative picture,
wherein, in the update processing, the estimated value of the pixel in the high-resolution picture is updated so that a value of an evaluation function is decreased, the evaluation function including, as a variable, a difference between a value of a pixel in the reference pictures after the positioning processing and the estimated value of the pixel in a target high-resolution picture model, and
wherein said second repetition processing unit includes:
an update unit operable to update the estimated value of the pixel so that the value of the evaluation function is decreased;
a second determination unit that determines whether a pixel satisfies a completion condition from a result of the update processing; and
an exclusion unit that excludes the pixel determined to satisfy the completion condition from the update processing.

11. The image processing device according to claim 10,
wherein said second determination unit determines that the pixel satisfies the completion condition when an amount of the update, which is the difference between the value of the pixel before the update and the value of the pixel after the update, is equal to a threshold value.

12. The image processing device according to claim 11,
wherein the threshold value is a predetermined value.

13. The image processing device according to claim 11,
wherein the threshold value is determined so that a proportion of a number of pixels that are not excluded by said second determination unit to a number of all of the pixels of the high-resolution picture is less than or equal to a predetermined value.

14. The image processing device according to claim 10, wherein said update unit calculates a gradient of the evaluation function by using only values of pixels that are not excluded by said second determination unit, and updates the estimated value of the pixel of the high-resolution picture based on the gradient.

15. The image processing device according to claim 10, wherein said update unit ends update of estimated values of all pixels when a rate of reduction in a total of differences for pixels that are not excluded by said second determination unit becomes less than a predetermined value.

16. An image processing method which uses a representative picture having a first resolution and a plurality of reference pictures having the first resolution that are related to the representative picture to generate a target high-resolution picture having a second resolution higher than the first resolution, said image processing method comprising:

performing positioning processing for a reference picture from among the plurality of reference picture, said performing positioning processing being repeatedly performed while switching from one reference picture to another reference picture;

determining whether or not the positioning processing has been performed for all of the plurality of reference pictures; and repeating update processing for updating an estimated value of a pixel in the target high-resolution picture after completion of the positioning processing performed in said repeating of the positioning processing, wherein, in the positioning processing, an amount of displacement of the reference picture from the representative picture is estimated, and based on the estimated amount of displacement, a pixel of the reference picture is positioned at a sub-pixel position in a high-resolution picture produced by enlarging the representative picture, and wherein, in the update processing, the estimated value of the pixel in the high-resolution picture is updated so that a value of an evaluation function is decreased, the evaluation function including, as a variable, a difference between a value of a pixel in the reference pictures and the estimated value of the pixel in the target high-resolution picture, and wherein at least one of the first repetition processing and the second repetition processing includes:

determining whether a pixel satisfies a completion condition from a result of one of the positioning processing and the update processing; and excluding the pixel that is determined to satisfy the completion condition from one of the positioning processing and the update processing.

17. A non-transitory computer-readable recording medium having stored thereon a program, wherein when executed, the program causes a computer to perform the image processing method according to claim 16.

18. A semiconductor integrated circuit which uses a representative picture having a first resolution and a plurality of reference pictures having the first resolution that are related to the representative picture to generate a target high-resolution picture having a second resolution higher than the first resolution, said semiconductor integrated circuit comprising:

a first repetition processing unit that performs positioning processing for a reference picture from among the plurality of reference pictures, said first repetition processing unit repeatedly performing the positioning processing while switching from one reference picture to another reference picture;

a first determination unit operable to determine whether or not the positioning processing has been performed for all of the plurality of reference pictures; and a second repetition processing unit that repeats update processing for updating an estimated value of a pixel in a target high-resolution picture after completion of the positioning processing performed by said first repetition processing unit;

wherein, in the positioning processing, an amount of displacement of the reference picture from the representative picture is estimated, and based on the estimated amount of displacement, a pixel of the reference picture is positioned at a sub-pixel position in a high-resolution picture produced by enlarging the representative picture, and wherein, in the update processing, the estimated value of the pixel in the high-resolution picture is updated so that a value of an evaluation function is decreased, the evaluation function including, as a variable, a difference between a value of a pixel in the reference pictures after the positioning processing and the estimated value of the pixel in the target high-resolution picture, and wherein at least one of said first and second repetition processing units includes:

a second determination unit operable to determine whether a pixel satisfies a completion condition from a result of one of the positioning processing and the update processing; and an exclusion unit operable to exclude the pixel that is determined to satisfy the completion condition from one of the positioning processing and the update processing.

* * * * *